US012688400B2

(12) United States Patent
Lan et al.

(10) Patent No.: US 12,688,400 B2
(45) Date of Patent: Jul. 21, 2026

(54) COMPUTATIONAL NEURAL NETWORK APPARATUS, CARD, METHOD, AND READABLE STORAGE MEDIUM

(71) Applicant: Cambricon Technologies Corporation Limited, Beijing (CN)

(72) Inventors: Huiying Lan, Beijing (CN); Ruitao Wang, Beijing (CN); Haizhao Luo, Beijing (CN); Bo Cao, Beijing (CN); Xunyu Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 426 days.

(21) Appl. No.: 18/003,684

(22) PCT Filed: Dec. 25, 2021

(86) PCT No.: PCT/CN2021/141394
§ 371 (c)(1),
(2) Date: Dec. 28, 2022

(87) PCT Pub. No.: WO2022/135600
PCT Pub. Date: Jun. 30, 2022

(65) Prior Publication Data
US 2024/0289591 A1 Aug. 29, 2024

(30) Foreign Application Priority Data
Dec. 25, 2020 (CN) .......................... 202011566115.9

(51) Int. Cl.
*G06N 3/02* (2006.01)
*G06N 3/0464* (2023.01)

(52) U.S. Cl.
CPC ............. *G06N 3/0464* (2023.01); *G06N 3/02* (2013.01)

(58) Field of Classification Search
CPC ............................... G06N 3/0464; G06N 3/02
See application file for complete search history.

(56) References Cited

U.S. PATENT DOCUMENTS

| | | | | |
|---|---|---|---|---|
| 11,537,838 B2 * | 12/2022 | Norden | .................... | G06N 3/08 |
| 2019/0050370 A1 | 2/2019 | Vilchis et al. | | |
| 2022/0092408 A1 * | 3/2022 | Khaitan | .................. | G06N 3/09 |

FOREIGN PATENT DOCUMENTS

| | | |
|---|---|---|
| CN | 107229967 A | 10/2017 |
| CN | 109754073 A | 5/2019 |

(Continued)

OTHER PUBLICATIONS

PCTCN2021141394—International Search Report and Written Opinion mailed on Mar. 11, 2022, 15 pages.

(Continued)

*Primary Examiner* — David Yi
*Assistant Examiner* — Paul Coleman
(74) *Attorney, Agent, or Firm* — Getech Law LLC; Jun Ye

(57) ABSTRACT

The present disclosure relates to an apparatus and a method for computing a neural network, a board card, and a readable storage medium. The computing apparatus of the present disclosure is included in an integrated circuit apparatus. The integrated circuit apparatus includes a general interconnection interface and other processing apparatus. The computing apparatus interacts with other processing apparatus to jointly complete a computing operation specified by a user. The integrated circuit apparatus further includes a storage apparatus. The storage apparatus is connected to the computing apparatus and other processing apparatus, respectively. The storage apparatus is used for data storage of the computing apparatus and other processing apparatus.

16 Claims, 18 Drawing Sheets

(56) References Cited

FOREIGN PATENT DOCUMENTS

| | | | |
|---|---|---|---|
| CN | 109784372 | A | 5/2019 |
| CN | 110321064 | A | 10/2019 |
| CN | 110490302 | A | 11/2019 |

OTHER PUBLICATIONS

CN202011566115.9—First Office Action mailed on Mar. 27, 2025, 23 pages.

Chen et al., "Deep Learning Processor Architecture", AI Computing Systems, Intelligent Computing System, China Machine Press, Apr. 30, 2020, 42 pages.

* cited by examiner

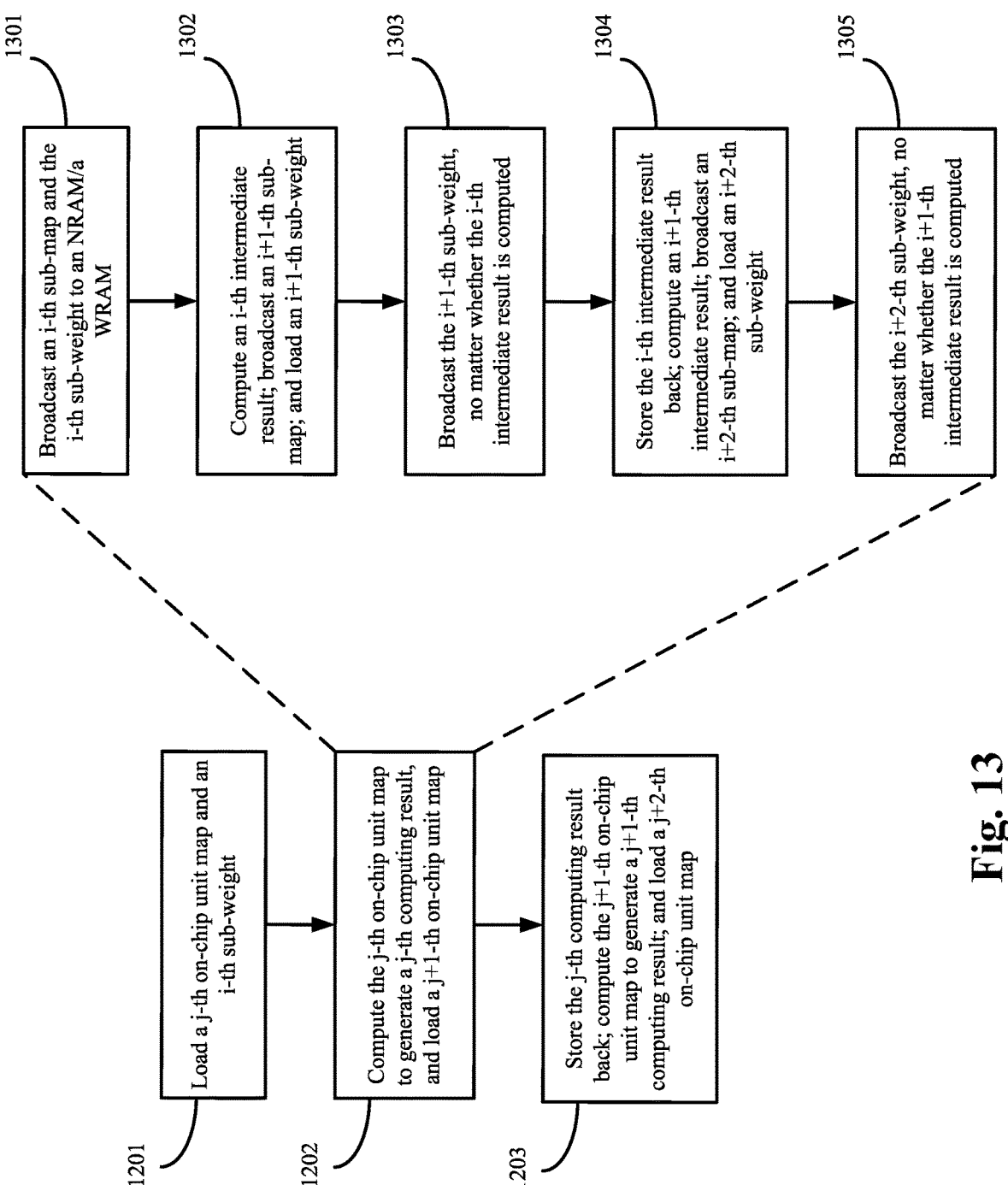

1301

Broadcast an i-th sub-map and the i-th sub-weight to an NRAM/a WRAM

1302

Compute an i-th intermediate result; broadcast an i+1-th sub-map; and load an i+1-th sub-weight

1303

Broadcast the i+1-th sub-weight, no matter whether the i-th intermediate result is computed

1304

Store the i-th intermediate result back; compute an i+1-th intermediate result; broadcast an i+2-th sub-map; and load an i+2-th sub-weight

1305

Broadcast the i+2-th sub-weight, no matter whether the i+1-th intermediate result is computed

1201

Load a j-th on-chip unit map and an i-th sub-weight

1202

Compute the j-th on-chip unit map to generate a j-th computing result, and load a j+1-th on-chip unit map

1203

Store the j-th computing result back; compute the j+1-th on-chip unit map to generate a j+1-th computing result; and load a j+2-th on-chip unit map

Fig. 13

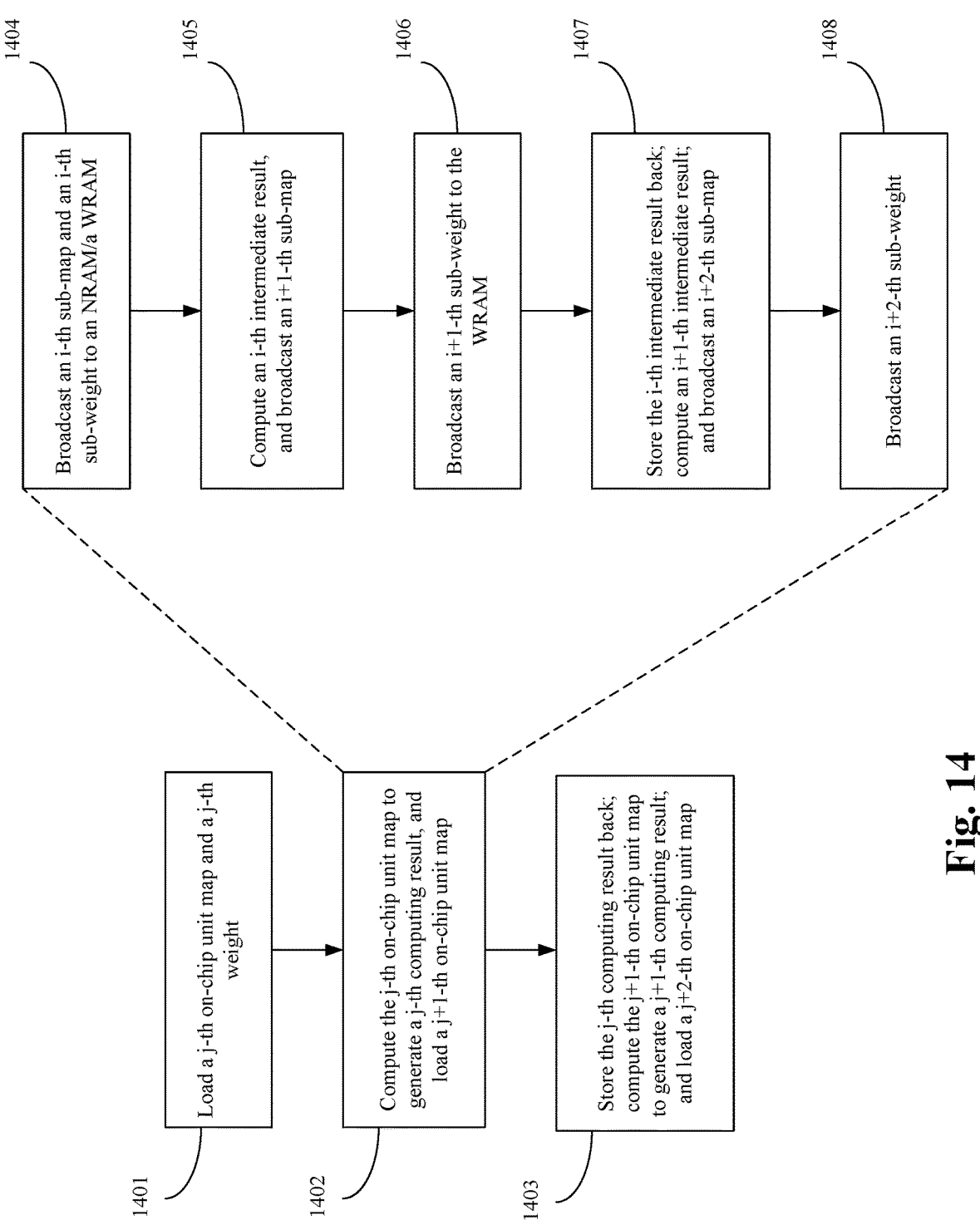

1404 Broadcast an i-th sub-map and an i-th sub-weight to an NRAM/a WRAM

1405 Compute an i-th intermediate result, and broadcast an i+1-th sub-map

1406 Broadcast an i+1-th sub-weight to the WRAM

1407 Store the i-th intermediate result back; compute an i+1-th intermediate result; and broadcast an i+2-th sub-map 1408 Broadcast an i+2-th sub-weight 1401 Load a j-th on-chip unit map and a j-th weight 1402 Compute the j-th on-chip unit map to generate a j-th computing result, and load a j+1-th on-chip unit map 1403 Store the j-th computing result back; compute the j+1-th on-chip unit map to generate a j+1-th computing result; and load a j+2-th on-chip unit map

Fig. 14

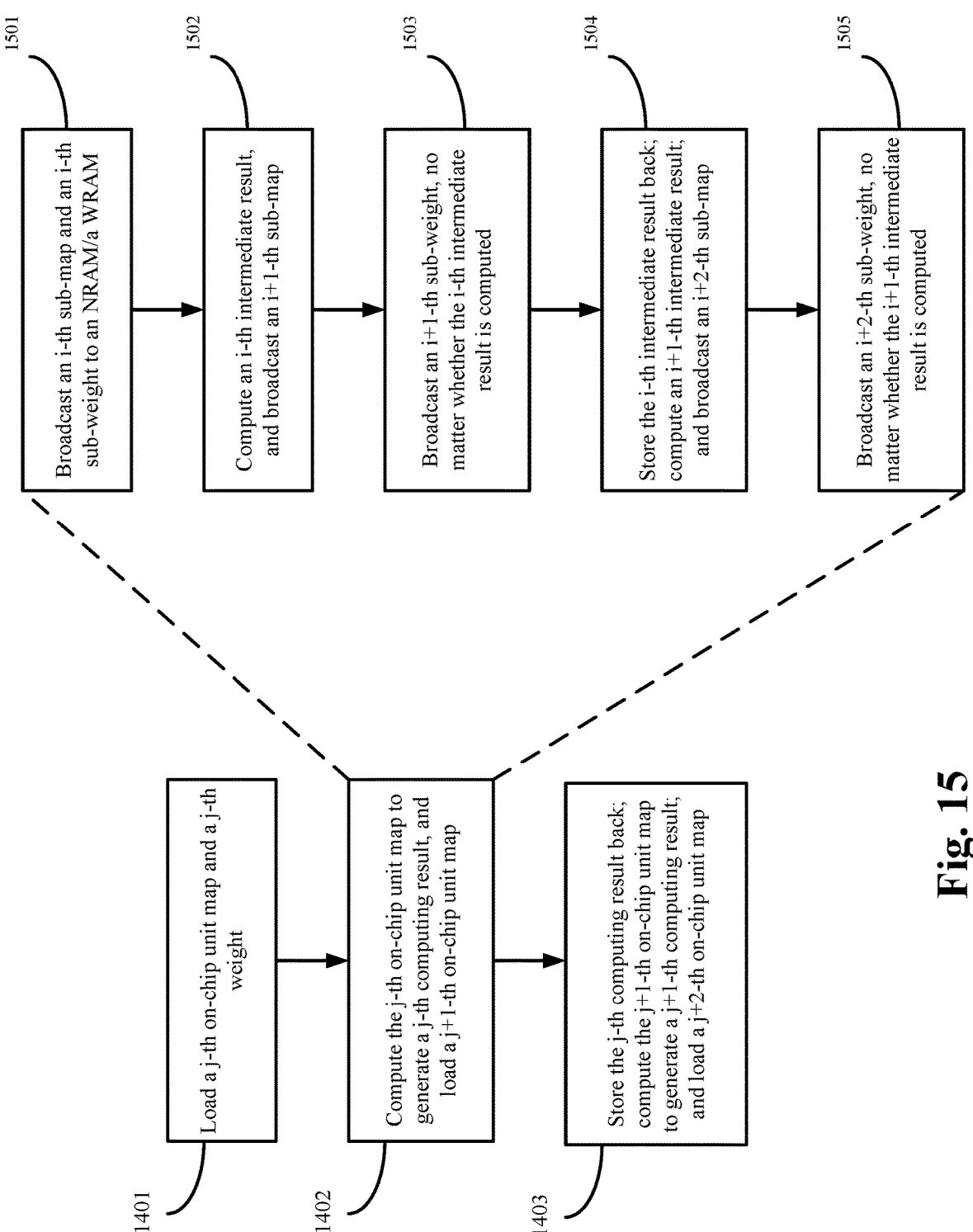

1501 Broadcast an i-th sub-map and an i-th sub-weight to an NRAM/a WRAM

1502 Compute an i-th intermediate result, and broadcast an i+1-th sub-map

1503 Broadcast an i+1-th sub-weight, no matter whether the i-th intermediate result is computed 1504 Store the i-th intermediate result back; compute an i+1-th intermediate result; and broadcast an i+2-th sub-map 1505 Broadcast an i+2-th sub-weight, no matter whether the i+1-th intermediate result is computed 1401 Load a j-th on-chip unit map and a j-th weight 1402 Compute the j-th on-chip unit map to generate a j-th computing result, and load a j+1-th on-chip unit map 1403 Store the j-th computing result back; compute the j+1-th on-chip unit map to generate a j+1-th computing result; and load a j+2-th on-chip unit map

Fig. 15

COMPUTATIONAL NEURAL NETWORK APPARATUS, CARD, METHOD, AND READABLE STORAGE MEDIUM

CROSS REFERENCE TO RELATED APPLICATIONS

This application is a 371 of international Patent Application No. PCT/CN2021/141394 filed Dec. 25, 2021, which claims priority to foreign Patent Application No. CN 202011566115.9, filed Dec. 25, 2020. The contents of each of the above-captioned patent applications are hereby expressly incorporated herein by reference in their entireties.

TECHNICAL FIELD

The present disclosure generally relates to a neural network field. More specifically, the present disclosure relates to an apparatus and a method for computing a neural network, a board card, and a readable storage medium.

BACKGROUND

A neural network is composed of a plurality of neuron systems connected according to certain rules. Roughly, the neural network is composed of following four kinds of layers: an input layer, a convolution layer, a pooling layer, and a fully connected layer.

The input layer is configured to truncate part of information from input data and convert the part of information into a feature matrix for presentation, where the feature matrix contains features corresponding to the part of information. The convolution layer is configured to receive the feature matrix from the input layer and perform feature extraction on the input data through a convolution operation. The convolution layer may be structured into a multi-layer convolution layer in practice. The pooling layer is configured to replace a certain area of data with a value. This value is usually a maximum value or an average value among all values in the area. By pooling, on the premise of not losing too much information, a size of a model may be reduced, and computing speed may be improved. The fully connected layer plays the role of a classifier in the whole convolution neural network. The fully connected layer performs feature space conversions, where all useful information in previous layers is extracted and integrated, and the information is compared based on different categories to judge whether the input data is similar to objects for comparison.

With the development of technology, the number of layers of the neural network is increasing. Taking a classical visual geometry group (VGG) architecture as an example, VGG-A has a total of 11 weight layers, VGG-B has a total of 13 weight layers, VGG-C has a total of 16 weight layers, VGG-D has a total of 16 weight layers, and VGG-E has a total of 19 weight layers. The convolution layer and the fully connected layer refer to the weight layer in general. Some neural networks even have hundreds of layers. Moreover, with the increase of the number of layers, the number of parameters of the neural network also increases exponentially. For example, AlexNet has 60 million parameters participating in computing.

Both multiple layers and multiple parameters require a large number of on-chip and off-chip input/output accesses and sufficient storage space. Therefore, a mechanism to reduce input/output accesses and storage space occupancy is urgently required in the field of artificial intelligence.

SUMMARY

In order to at least partly solve technical problems mentioned in the background, a solution of the present disclosure provides an apparatus and a method for computing a neural network, a board card, and a readable storage medium.

A first aspect of the present disclosure discloses a method for computing a neural network by using a computing apparatus. The computing apparatus is connected to an off-chip memory, where the off-chip memory contains an on-chip unit map and a corresponding weight. The computing apparatus includes a plurality of clusters, where each cluster includes a shared storage unit and a plurality of processor cores.

The method includes: loading the on-chip unit map and an i-th sub-weight in the weight from the off-chip memory to the shared storage unit; broadcasting an i-th sub-map in the on-chip unit map and the i-th sub-weight from the shared storage unit to at least one of the plurality of processor cores, where the i-th sub-weight corresponds to the i-th sub-map; computing an i-th intermediate result according to the i-th sub-map and the i-th sub-weight; loading an i+1-th sub-weight in the weight from the off-chip memory to the shared storage unit; broadcasting an i+1-th sub-map in the on-chip unit map from the shared storage unit to at least one of the plurality of processor cores, where the i+1-th sub-weight corresponds to the i+1-th sub-map; and broadcasting the i+1-th sub-weight from the shared storage unit to at least one of the plurality of processor cores.

A second aspect of the present disclosure discloses a computing apparatus, which is connected to an off-chip memory, where the off-chip memory contains an on-chip unit map and a corresponding weight. The computing apparatus includes a plurality of clusters, where each cluster includes a shared storage unit, a direct memory access unit, a plurality of processor cores, and a broadcast bus.

The direct memory access unit is configured to: load the on-chip unit map and an i-th sub-weight in the weight from the off-chip memory to the shared storage unit; and load an i+1-th sub-weight in the weight from the off-chip memory to the shared storage unit.

The broadcast bus is configured to: broadcast an i-th sub-map in the on-chip unit map and the i-th sub-weight from the shared storage unit to at least one of the plurality of processor cores, where the i-th sub-weight corresponds to the i-th sub-map; broadcast an i+1-th sub-map in the on-chip unit map from the shared storage unit to at least one of the plurality of processor cores, where the i+1-th sub-weight corresponds to the i+1-th sub-map; and broadcast the i+1-th sub-weight from the shared storage unit to at least one of the plurality of processor cores.

The at least one of the plurality of processor cores is configured to compute an i-th intermediate result according to the i-th sub-map and the i-th sub-weight.

A third aspect of the present disclosure discloses an integrated circuit apparatus, including the computing apparatus. Moreover, the present disclosure also discloses a board card, including the integrated circuit apparatus.

A fourth aspect of the present disclosure discloses a computer readable storage medium, on which computer program codes for computing a neural network by using a computing apparatus are stored. When the computer program codes are run by a processing apparatus, the method is performed.

The present disclosure, based on a three-level operation hierarchy of system on chip-cluster-processor core and three-level memory design of dynamic random access memory (DRAM)-static random access memory (SRAM)-neuron random access memory (NRAM)/weight random access memory (WRAM), creates a three-level pipeline with two layers, which makes full use of hardware resources and improves neural network computing efficiency.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary manner rather than a restrictive manner, and the same or corresponding reference numerals indicate the same or corresponding parts.

FIG. 13 is a flowchart according to another policy for moving a weight according to an embodiment of the present disclosure.

FIG. 14 is a flowchart according to another policy for moving a weight according to an embodiment of the present disclosure.

FIG. 15 is a flowchart according to another policy for moving a weight according to an embodiment of the present disclosure.

DETAILED DESCRIPTION

Figure 1:
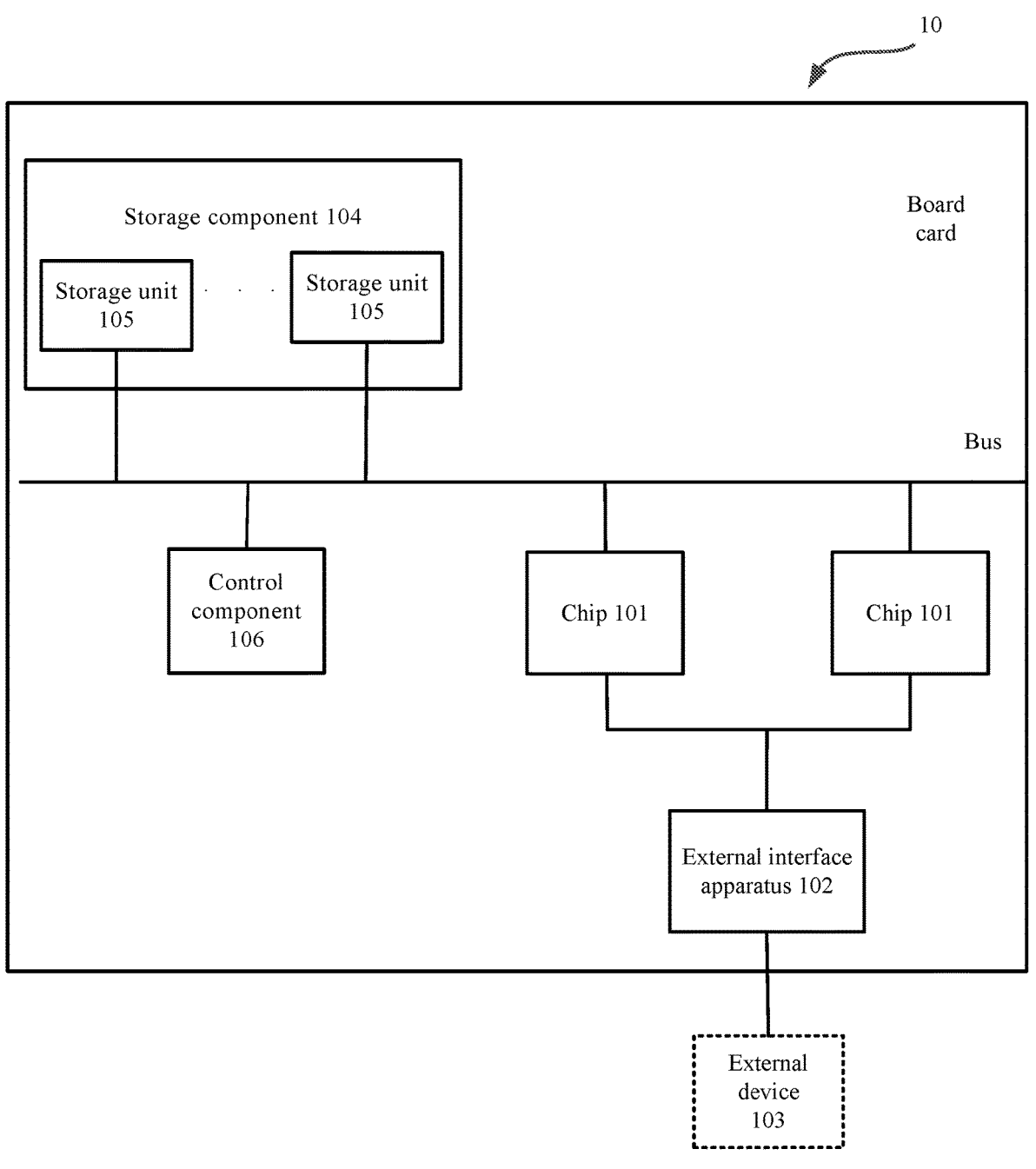
FIG. 1 is a structural diagram of a board card according to an embodiment of the present disclosure.

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in the claims, the specification, and the drawings of the present disclosure are used for distinguishing different objects rather than describing a specific order. Terms such as "including" and "comprising" used in the specification and the claims of the present disclosure indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely for a purpose of describing a particular embodiment rather than limiting the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims of the present disclosure refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with drawings below.

A neural network is composed of an input layer, a convolution layer, an activation function, a pooling layer, and a fully connected layer, with several layers at least and hundreds of layers at most. Each layer performs one operator. For example, the convolution layer performs a convolution operator, and there are as many layers as there are operators that are required to be performed. In the present disclosure, when a particular layer is mentioned, the layer refers to an operator corresponding to the layer.

When neural network computing is performed, input information and an output result of each layer of a model are different in each inference computing and are viewed as variable data. The variable data is generally represented by a feature map (matrix). In the present disclosure, input information of the whole neural network model and an input map of each layer of the model are collectively called feature maps. Once a feature map is loaded onto an on-chip memory component, the feature map is referred as an on-chip unit map in the present disclosure. Parameters for training a network model usually do not change frequently after the training is stabilized, or the parameters are compiled and generated after a network topology structure and hardware parameters are determined. The parameters do not change during the computing, so the parameters may be viewed as constant data. The constant data includes but is not limited to a weight, a bias, a device hardware instruction, a mean and a variance of batchnorm, and the like. In the present disclosure, the weight is used to represent all constant data uniformly. However, when "data" is mentioned in the present disclosure, the "data" generally refers to a map structure that allows operations corresponding to operators to be fused together in the neural network model according to a fusion policy. Variable data and constant data involved in the map structure are feature maps plus corresponding weights.

FIG. 1 is a schematic structural diagram of a board card 10 according to an embodiment of the present disclosure. As shown in FIG. 1, the board card 10 includes a chip 101, which is a system on chip (SoC), or called an on-chip system, and integrates one or a plurality of combined processing apparatuses. The combined processing apparatus is a kind of artificial intelligence operation unit, which is used to support various deep learning algorithms and various machine learning algorithms to meet requirements for intelligent processing in complex scenarios in computer vision, speech, natural language processing, data mining, and other fields. In particular, deep learning technology is widely applied in the field of cloud intelligence. A prominent feature of cloud intelligence applications is a large amount of input data, which has high requirements for storage capacity and computing power of a platform. The board card 10 of this embodiment is suitable for cloud intelligent applications and has huge off-chip storage, huge on-chip storage, and a large amount of computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data may be transferred from the external device 103 to the chip 101 through the external interface apparatus 102. A computing result of the chip 101 may still be sent back to the external device 103 through the external interface apparatus 102. According to different application scenarios, the external interface apparatus 102 may have different interface forms, such as a peripheral component interconnect express (PCIe) interface.

The board card 10 further includes a storage component 104 used for storing data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include a micro controller unit (MCU).

Figure 2:
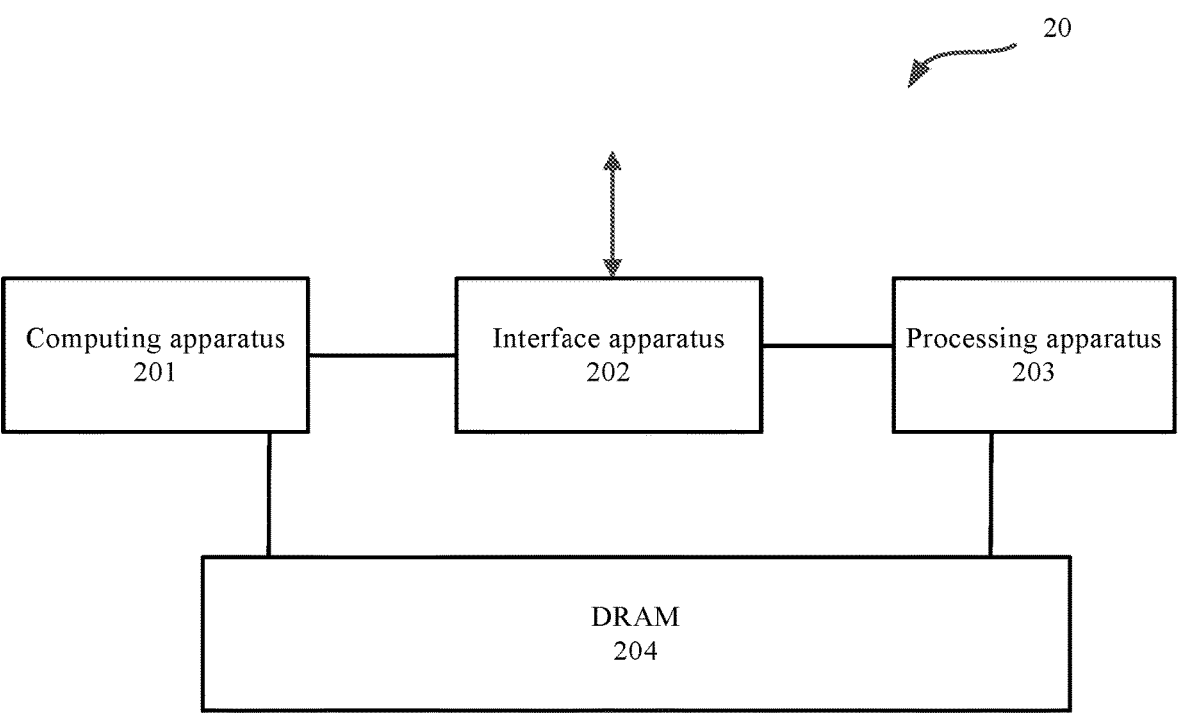
FIG. 2 is a structural diagram of an integrated circuit apparatus according to an embodiment of the present disclosure.

FIG. 2 is a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random access memory (DRAM) 204.

The computing apparatus 201 is configured to perform an operation specified by a user. The computing apparatus 201 is mainly implemented as a single-core intelligent processor or a multi-core intelligent processor. The computing apparatus 201 is used for performing deep learning computing or machine learning computing. The computing apparatus 201 interacts with the processing apparatus 203 through the interface apparatus 202 to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. Alternatively or optionally, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more types of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when considered together, the computing apparatus 201 and the processing apparatus 203 are viewed as forming a heterogeneous multi-core structure.

The DRAM 204 is an off-chip memory and is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
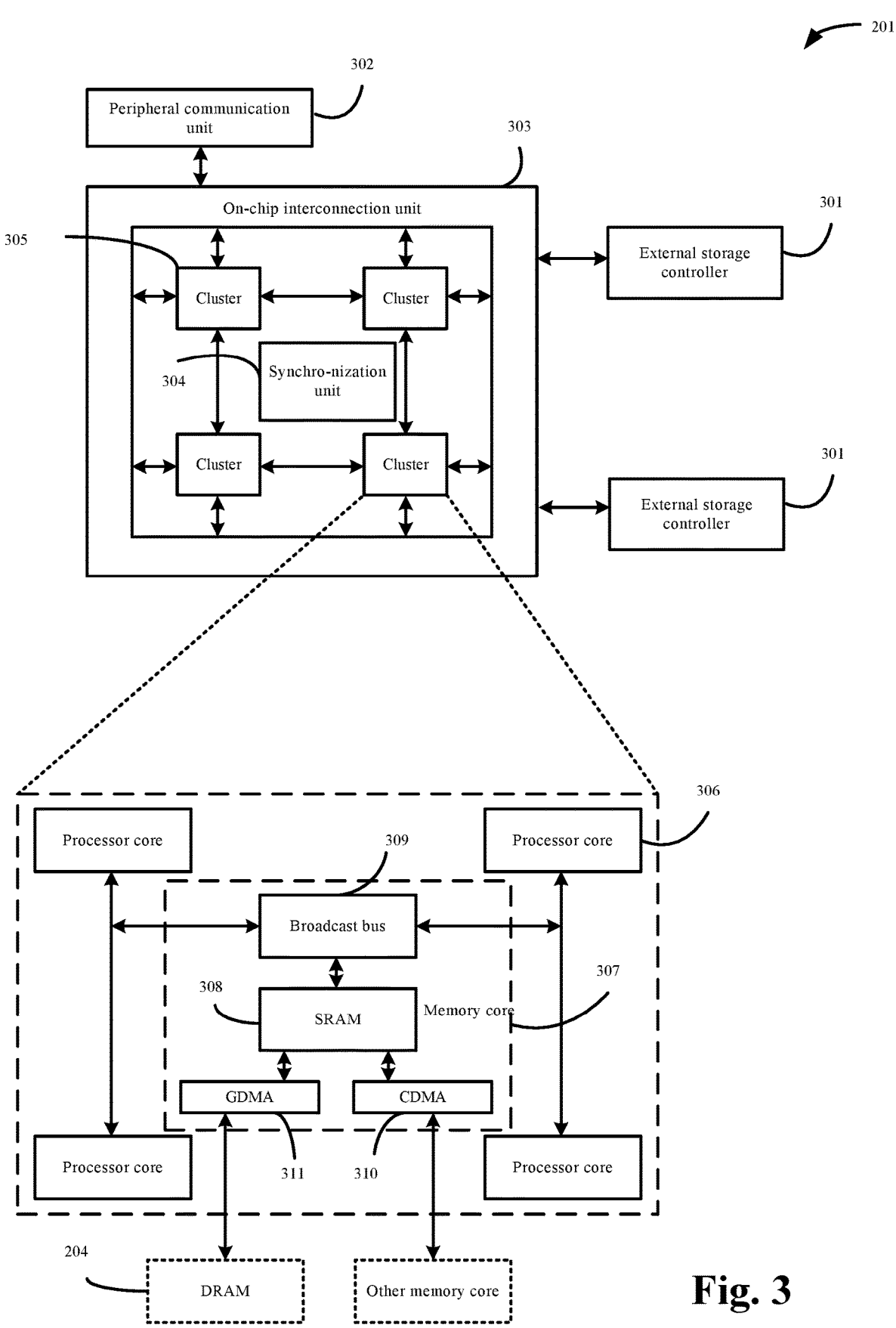
FIG. 3 is a schematic diagram of an internal structure of a computing apparatus according to an embodiment of the present disclosure.

FIG. 3 is a schematic diagram of an internal structure of the computing apparatus 201. The computing apparatus 201 is used for processing input data in computer vision, speech, natural language, and data mining. The computing apparatus 201 in the figure is designed in a multi-core hierarchical structure. The computing apparatus 201 serves as an on-chip system and includes a plurality of clusters, where each cluster further includes a plurality of processor cores. In other words, the computing apparatus 201 is composed of an on-chip system-cluster-processor core hierarchy.

In terms of a hierarchy of the on-chip system, as shown in FIG. 3, the computing apparatus 201 includes an external storage controller 301, a peripheral communication unit 302, an on-chip interconnection unit 303, a synchronization unit 304, and a plurality of clusters 305.

There may be a plurality of external storage controllers 301, two of which are illustrated in the figure. The external storage controllers are used to, in response to access requests from the processor cores, access an external storage device, such as the DRAM 204 in FIG. 2, thereby reading data from off-chip or writing the data to off-chip. The peripheral communication unit 302 is used to receive a control signal from the processing apparatus 203 through the interface apparatus 202 and start the computing apparatus 201 to perform a task. The on-chip interconnection unit 303 connects the external storage controller 301, the peripheral communication unit 302, and the plurality of clusters 305. The on-chip interconnection unit 303 is used for transferring data and control signals between units. The synchronization unit 304 is a global barrier controller (GBC) and is used to coordinate a work progress of each cluster and ensure synchronization of information. The plurality of clusters 305 are computing cores of the computing apparatus 201, four of which are illustrated in the figure. With the development of hardware, the computing apparatus 201 of the present disclosure may further include 8, 16, 64, or even more clusters 305. The clusters 305 are used to efficiently perform deep learning algorithms.

In terms of a hierarchy of the clusters, as shown in FIG. 3, each cluster 305 includes a plurality of processor cores (intelligent processing unit (IPU) cores) 306 and a memory core (MEM core) 307.

Figure 4:
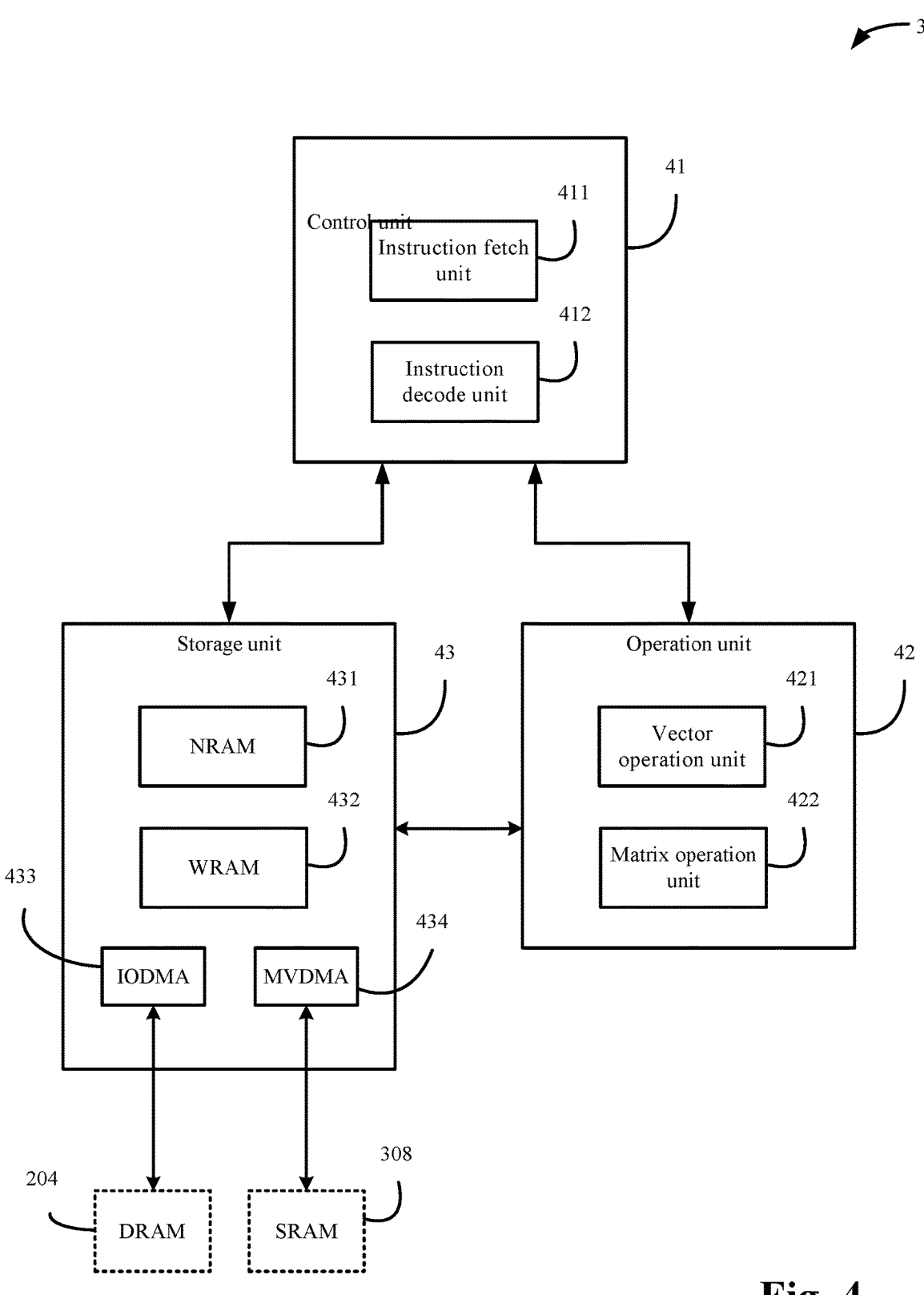
FIG. 4 is a schematic diagram of an internal structure of a processor core according to an embodiment of the present disclosure.

Four processor cores 306 are illustrated in the figure. The present disclosure does not limit the number of the processor cores 306. An internal architecture of a processor core is shown in FIG. 4. Each processor core 306 includes three units: a control unit 41, an operation unit 42, and a storage unit 43.

The control unit 41 is used for coordinating and controlling work of the operation unit 42 and the storage unit 43 to complete a deep learning task. The control unit 41 includes an instruction fetch unit (IFU) 411 and an instruction decode unit (IDU) 412. The instruction fetch unit 411 is used for acquiring an instruction from the processing apparatus 203. The instruction decode unit 412 is used for decoding the instruction acquired and sending a decoding result as control information to the operation unit 42 and the storage unit 43.

The operation unit 42 includes a vector operation unit 421 and a matrix operation unit 422. The vector operation unit 421 is used for performing a vector operation and supports complex operations, such as vector multiplication, addition, and nonlinear conversion. The matrix operation unit 422 is responsible for core computing of deep learning algorithms, which includes matrix multiplication and convolution.

The storage unit 43 is used for storing or moving related data. The storage unit 43 includes a neuron random access memory (NRAM) 431, a weight RAM (WRAM) 432, an input/output direct memory access (IODMA) unit 433, and a move direct memory access (MVDMA) unit 434. The NRAM 431 is used for storing a feature map for computing by the processor cores 306 and an intermediate result after the computing. The WRAM 432 is used for storing a weight of a deep learning network. The IODMA 433 controls memory accesses of the NRAM 431/the WRAM 432 and the DRAM 204 through a broadcast bus 309. The MVDMA 434 is used for controlling memory accesses of the NRAM 431/the WRAM 432 and a shared RAM (SRAM) 308.

Going back to FIG. 3, the memory core 307 is mainly used for storage and communication. In other words, the memory core 307 is mainly used for storing shared data or intermediate results among the processor cores 306 and performing communication between the clusters 305 and the DRAM 204, communication between the clusters 305, and communication between the processor cores 306. In other embodiments, the memory core 307 is able to perform a scalar operation and is used for performing the scalar operation.

The memory core 307 includes the SRAM 308, the broadcast bus 309, a cluster direct memory access (CDMA) unit 310, and a global direct memory access (GDMA) unit 311. The SRAM 308 plays the role of a data transfer station with high performance. Data reused among different processor cores 306 in the same cluster 305 is not required to be acquired from the DRAM 204 separately through the processor cores 306. Instead, the data is transferred among the processor cores 306 through the SRAM 308. The memory core 307 is only required to quickly distribute the reused data from the SRAM 308 to the plurality of processor cores 306, so as to improve inter-core communication efficiency and greatly reduce on-chip and off-chip input/output accesses.

The broadcast bus 309, the CDMA 310, and the GDMA 311 are used for performing the communication between the processor cores 306, the communication between the clusters 305, and data transfer between the clusters 305 and the DRAM 204, respectively. The above will be explained separately below.

The broadcast bus 309 is used for completing high-speed communication between the processor cores 306 in the clusters 305. The broadcast bus 309 of this embodiment supports inter-core communication modes including unicast, multicast, and broadcast. The unicast refers to point-to-point (single processor core-to-single processor core) data transfer. The multicast refers to a communication mode for transferring one copy of data from the SRAM 308 to a certain number of processor cores 306. The broadcast refers to a communication mode for transferring one copy of data from the SRAM 308 to all processor cores 306. The broadcast is a special case of the multicast.

Figure 5:
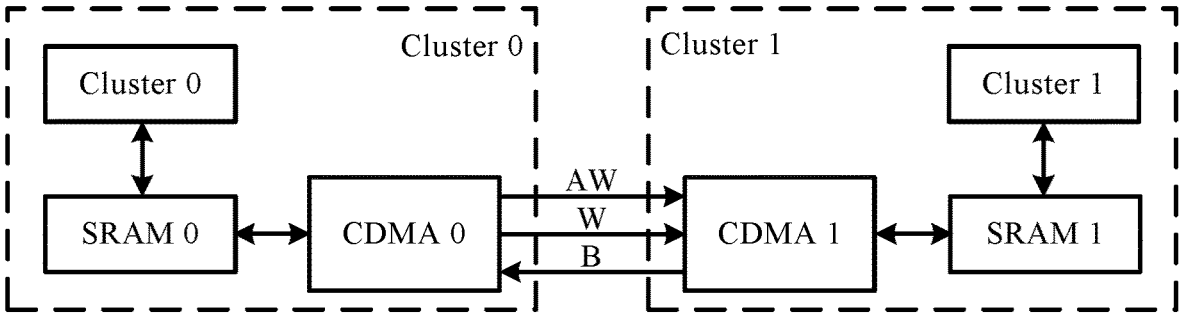
FIG. 5 is a schematic diagram that a processor core intends to write data to a processor core of another cluster.

The CDMA 310 is used for controlling memory accesses of the SRAM 308 among different clusters 305 in the same computing apparatus 201. FIG. 5 is a schematic diagram that a processor core intends to write data to a processor core of another cluster, so as to illustrate a working principle of the CDMA 310. In this application scenario, the same computing apparatus includes a plurality of clusters. For the convenience of illustration, only a cluster 0 and a cluster 1 are shown in the figure. The cluster 0 and the cluster 1 include a plurality of processor cores, respectively. Similarly, for the convenience of illustration, the cluster 0 in the figure shows only a processor core 0, and the cluster 1 in the figure shows only a processor core 1. The processor core 0 intends to write data to the processor core 1.

First, the processor core 0 sends a unicast write request to write the data to a local SRAM 0. A CDMA 0 serves as a master terminal, and a CDMA 1 serves as a slave terminal. The master terminal sends the write request to the slave terminal. In other words, the master terminal sends a write address AW and write data W and sends the data to an SRAM 1 of the cluster 1. Next, the slave terminal sends a write response B in response. Finally, the processor core 1 of the cluster 1 sends a unicast read request to read the data from the SRAM 1.

Going back to FIG. 3, the GDMA 311 works with the external storage controller 301 and is used for controlling memory accesses from the SRAM 308 to the DRAM 204 in the clusters 305 or reading the data from the DRAM 204 to the SRAM 308 in the clusters 305. It may be known from the above that communication between the DRAM 204 and the NRAM 431 or the WRAM 432 may be implemented through two channels. A first channel is to directly connect the DRAM 204 with the NRAM 431 or the WRAM 432 through the IODAM 433. A second channel is to transfer the data between the DRAM 204 and the SRAM 308 through the GDMA 311 first, and then to transfer the data between the SRAM 308 and the NRAM 431 or the WRAM 432 through the MVDMA 434. Although it seems that the second channel requires more components and has long data flows, in fact, in some embodiments, a bandwidth of the second channel is much greater than that of the first channel. Therefore, the communication between the DRAM 204 and the NRAM 431 or the WRAM 432 may be more efficient through the second channel. The embodiment of the present disclosure may select a data transfer channel according to hardware conditions.

In other embodiments, a function of the GDMA 311 and a function of the IODMA 433 may be integrated in the same component. For the convenience of description, the GDMA 311 and the IODMA 433 are viewed as different components in the present disclosure. For those skilled in the art, as long as functions and technical effects realized by the GDMA 311 and the IODMA 433 are similar to those of the present disclosure, the GDMA 311 and the IODMA 433 shall fall within the scope of protection of the present disclosure. Further, the function of GDMA 311, the function of IODMA 433, a function of CDMA 310, and a function of MVDMA 434 may also be implemented by the same component. Similarly, as long as functions and technical effects realized by the component are similar to that of the present disclosure, the component shall fall within the scope of protection of the present disclosure.

In the hardware structure described above, the inside of the computing apparatus 201 is called on-chip, and a component outside of the computing apparatus 201 is called off-chip. In performing deep learning computing at each layer, a lot of off-chip and on-chip accesses are required. Especially, data is read from the DRAM 204 to the computing apparatus 201, and then a computing result of the computing apparatus 201 is stored to the DRAM 204. This kind of frequent access consumes a lot of hardware resources. To solve this problem, an embodiment of the present disclosure greatly reduces off-chip and on-chip accesses and simultaneously reduces on-chip weight storage requirements by planning a weight moving mechanism.

One important reason why the computing apparatus 201 has strong computing power lies in a three-level operation hierarchy of system on chip-cluster-processor core in combination with three-level memory design of DRAM-SRAM-NRAM/WRAM, which enables data to be cached and computed at appropriate levels, thereby forming sufficient pipelines.

When the computing apparatus 201 performs computing, the computing may be mainly divided into three phases: loading phase: loading data; computing phase: moving data, computing, moving intermediate results; and storing phase: storing results back.

Figure 6:
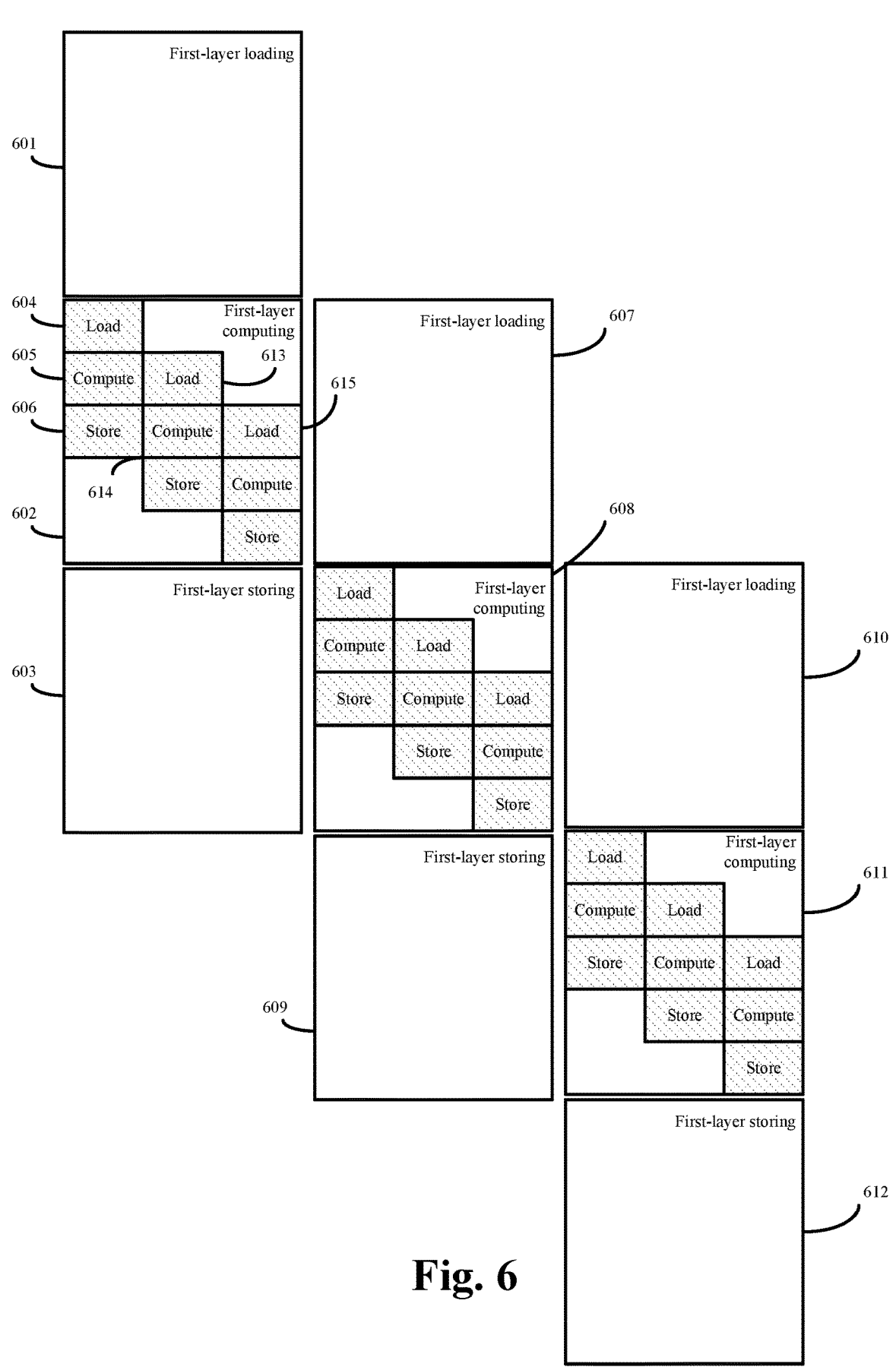
FIG. 6 is a schematic diagram of a three-level pipeline with two layers according to an embodiment of the present disclosure.

More specifically, this embodiment adopts a three-level pipeline with two layers. As shown in FIG. 6, a first-layer load phase 601, a first-layer compute phase 602, and a first-layer store phase 603 occur at the cluster level. In the first-layer load phase 601, the GDMA 330 loads data from the DRAM 204 to the SRAM 308. In the first-layer compute phase 602, the cluster 305 computes a loaded on-chip unit map and generates a computing result. In the first-layer store phase 603, the GDMA 330 stores the computing result from the SRAM 308 back to the DRAM 204.

Since the cluster 305 includes a plurality of processor cores 306, and the first-layer compute phase 602 actually splits the on-chip unit map into corresponding sub-maps through the memory core 307 and broadcasts the sub-maps to at least one processor cores 306 for computing. Therefore, a three-level pipeline of a second layer is operated in the processor cores 306. More specifically, in a second-layer load phase 604, the MVDMA 434 loads the sub-maps from the SRAM 308 to the NRAM 431. In a second-layer compute phase 605, the sub-maps and sub-weights are moved to the operation unit 42 for computing, and then an intermediate result is moved back to the NRAM 431. In a second-layer store phase 606, the MVDMA 434 stores the intermediate result from the NRAM 431 back to the SRAM 308.

A first-layer pipeline means that the first-layer load phase 601, the first-layer compute phase 602, and the first-layer store phase 603 may be concurrent. Here takes a case where the same cluster 305 intends to process a j-th on-chip unit map, a j+1-th on-chip unit map, and a j+2-th on-chip unit map as an example. First, the j-th on-chip unit map is loaded to the SRAM 308 in the first-layer load phase 601. Next, the j-th on-chip unit map is computed in the first-layer compute phase 602, and a first computing result is moved back to the SRAM 308. While the j-th on-chip unit map is computed, the j+1-th on-chip unit map is loaded to the SRAM 308 in a first-layer load phase 607. When the first computing result is stored back to the DRAM 204 in the first-layer store phase 603, the j+1-th on-chip unit map is computed in a first-layer compute phase 608, and a second computing result is moved back to the SRAM 308. Simultaneously, the j+2-th on-chip unit map is loaded to the SRAM 308 in a first-layer load phase 610. The first-layer pipeline is rolled in this way.

To cooperate with operations of the aforementioned pipeline, the SRAM 308 of this embodiment includes two pieces of storage space: a ping storage unit and a pong storage unit. The pipeline of data is divided into three types according to ping-pong properties of the SRAM 308: input/output (I/O) parity, input parity, and no parity. The I/O parity may support the parallel of loading, computing, and storing. To implement the I/O parity, the ping storage unit and the pong storage unit are required to be exactly the same for loading and storing respectively. The input parity only supports the parallel of storing and computing and additionally increases moving time in the SRAM 308. Compared with the I/O parity, the ping storage unit and the pong storage unit are not required to be exactly the same, but a cache of the same size as store storage space is required to be allocated. The no parity refers to the serial of loading/storing and computing, and space is not required to be allocated additionally.

To implement the aforementioned first-layer pipeline, the SRAM 308 of this embodiment has the same size ping storage unit and pong storage unit, so as to achieve the effect of the I/O parity. Still taking FIG. 6 for illustration, storage areas involved in the first-layer load phase 601, the first-layer compute phase 602, and the first-layer store phase 603 of the j-th on-chip unit map are restricted to the ping storage unit. Storage areas involved in the first-layer load phase 607, the first-layer compute phase 608, and a first-layer store phase 609 of the j+1-th on-chip unit map are restricted to the pong storage unit. Storage areas involved in the first-layer load phase 610, a first-layer compute phase 611, and a first-layer store phase 612 of the j+2-th on-chip unit map are restricted to the ping storage unit again. In this way, the ping storage unit and the pong storage unit are used alternately.

A second-layer pipeline means that the second-layer load phase 604, the second-layer compute phase 605, and the second-layer store phase 606 may be concurrent. Here tries to take a case where the same processor core 306 intends to process an i-th sub-map, an i+1-th sub-map, and an i+2-th sub-map in the j-th on-chip unit map as an example. First, the i-th sub-map is broadcast to the NRAM 431 in the second-layer load phase 604. Next, the i-th sub-map is computed in the second-layer compute phase 605 to generate an i-th intermediate result, and the i-th intermediate result is moved back to the NRAM 431. Simultaneously, the i+1-th sub-map is broadcast to the NRAM 431 in a second-layer load phase 613. The i-th intermediate result is stored back to the SRAM 308 in the second-layer store phase 606. Simultaneously, the i+1-th sub-map is computed in a second-layer compute phase 614 to generate an i+1-th intermediate result, and the i+1-th intermediate result is moved back to the NRAM 431. Moreover, the i+2-th sub-map is loaded to the NRAM 431 in a second-layer load phase 615.

Considering that each cluster 305 has a different task, and completion time is naturally different, the synchronization unit 304 of this embodiment may synchronize task completion time by using a synchronization barrier instruction, so as to avoid timing errors.

For a weight, in order to implement the aforementioned double-layer pipeline, there are several polices to move the weight.

Figure 7A:
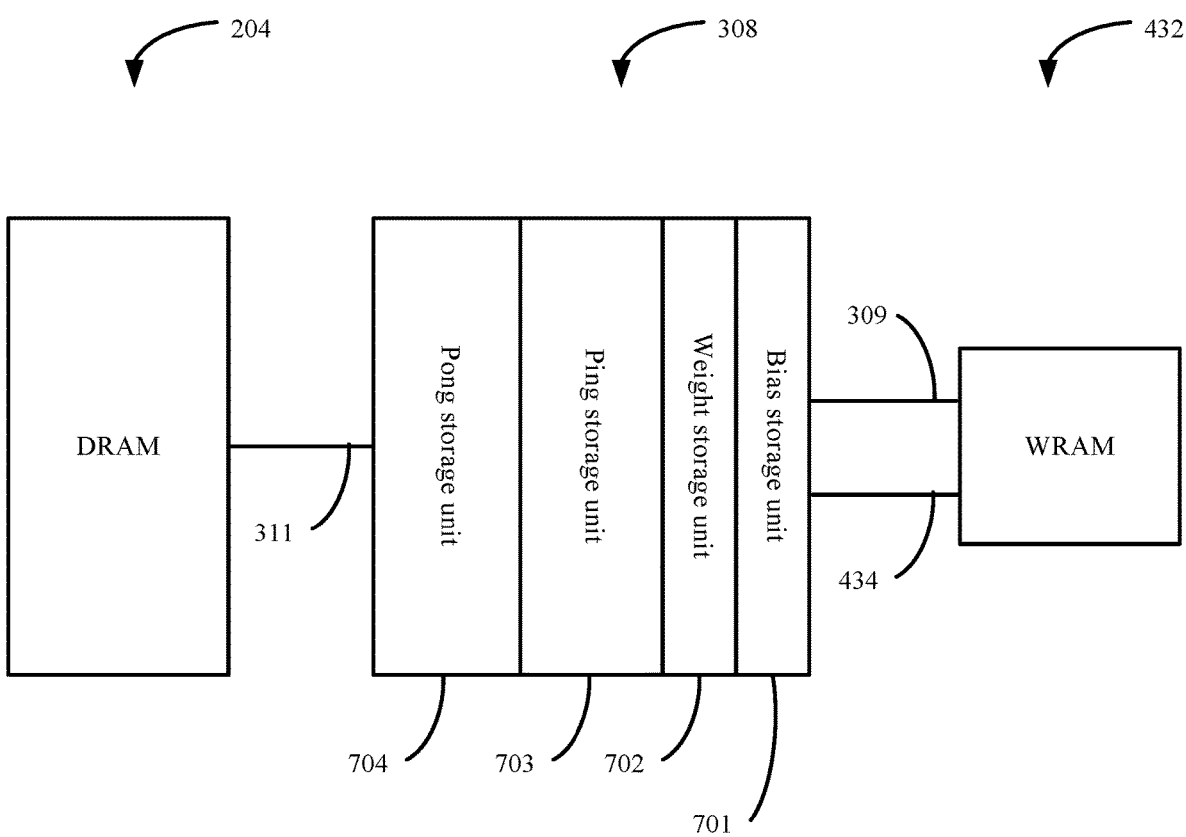
FIG. 7A is a schematic diagram of a policy for moving a weight according to an embodiment of the present disclosure.

A policy is shown in FIG. 7A. The SRAM 308 is divided into four pieces of space, which are other parameter storage unit 701, a weight storage unit 702, a ping storage unit 703, and a pong storage unit 704, respectively. Other parameter storage unit 701 is configured to load a parameter other than the weight, such as bias data, from the DRAM 204. The weight storage unit 702 is a whole block of storage space and is used to load weight data from the DRAM 204. The ping storage unit 703 and the pong storage unit 704 are configured to load different on-chip unit maps or corresponding intermediate results stored back from the NRAM 321 from the DRAM 204, as mentioned earlier. The WRAM 432 is a whole block of storage space.

In the first-layer load phase 601, the GDMA 311 loads the j-th on-chip unit map from the DRAM 204 to the ping storage unit 703 and also loads an i-th sub-weight (corresponding to the i-th sub-map of the j-th on-chip unit map) in the weight from the DRAM 204 to the weight storage unit 702. In the first-layer compute phase 602, the broadcast bus 309 broadcasts the i-th sub-map in the on-chip unit map and the i-th sub-weight from the SRAM 308 to the NRAM 431 and the WRAM 432 of at least one of the plurality of processor cores 306 in the second-layer load phase 604. The operation unit 42 of the processor core 306 computes the i-th intermediate result in the second-layer compute phase 605 according to the i-th sub-map and the i-th sub-weight. Simultaneously, the broadcast bus 309 broadcasts the i+1-th sub-map in the j-th on-chip unit map from the SRAM 308 to the NRAM 431 in the second-layer load phase 613. Since the i-th sub-weight has been loaded into the WRAM 432, the space of the weight storage unit 702 may be freed up. Therefore, at the same time, the GDMA 311 loads an i+1-th sub-weight (corresponding to the i+1-th sub-map) in the weight from the DRAM 204 to the weight storage unit 702. Since the weight storage unit 702 is a whole block of storage space, the i-th sub-weight in the weight storage unit 702 is overwritten by the i+1-th sub-weight.

After the i-th intermediate result is generated, the broadcast bus 309 broadcasts the i+1-th sub-weight from the weight storage unit 702 to the WRAM 432. Since the WRAM 432 is also a whole block of storage space, the i-th sub-weight is also overwritten by the i+1-th sub-weight. It is required to be noted that the broadcast bus 309 broadcasts the i+1-th sub-weight to the WRAM 432 only after the i-th intermediate result is generated. The reason is that if the i+1-th sub-weight is broadcast to the WRAM 432 when commuting the i-th intermediate result, it may be required to read the i-th sub-weight from the WRAM 432 at any time during the computing. However, the i-th sub-weight has been overwritten, which may cause a computing result to be wrong.

In the second-layer store phase 606, the MVDMA 434 stores the i-th intermediate result back to the ping storage unit 703. At the same time, the operation unit 42 computes an i+1-th intermediate result in the second-layer compute phase 614 according to the i+1-th sub-map and the i+1-th sub-weight. Moreover, an i+2-th sub-map enters the second-layer load phase 615, and the broadcast bus 309 broadcasts the i+2-th sub-map from the SRAM 308 to the NRAM 431. At the same time, the GDMA 311 loads an i+2-th sub-weight (corresponding to the i+2-th sub-map) in the weight from the DRAM 204 to the weight storage unit 702. The i+1-th sub-weight in the weight storage unit 702 is overwritten by the i+2-th sub-weight.

After the i+1-th intermediate result is generated, the broadcast bus 309 broadcasts the i+2-th sub-weight from the weight storage unit 702 to the WRAM 432. The i+1-th sub-weight in the WRAM 432 is also overwritten by the i+2-th sub-weight.

In this policy, a weight required for computing the j-th on-chip unit map is not loaded into the SRAM 308 together with the j-th on-chip unit map at a time, but only a sub-weight corresponding to a sub-map is loaded into the SRAM 308 each time. Only one sub-weight is stored in the weight storage unit 702 at the same time. Therefore, before performing a computing task, the computing apparatus 201 first identifies the largest of all sub-weights in the weight and then determines a size of the weight storage unit 702 according to the largest sub-weight. For example, the weight is divided into five sub-weights, sizes of which are 50 KB, 100 KB, 120 KB, 300 KB, and 200 KB, respectively. The largest size is 300 KB, and the computing apparatus 201 then splits 300 KB space for the weight storage unit 702. Such space is enough to store each sub-weight, and on-chip storage space is saved.

Figure 7B:
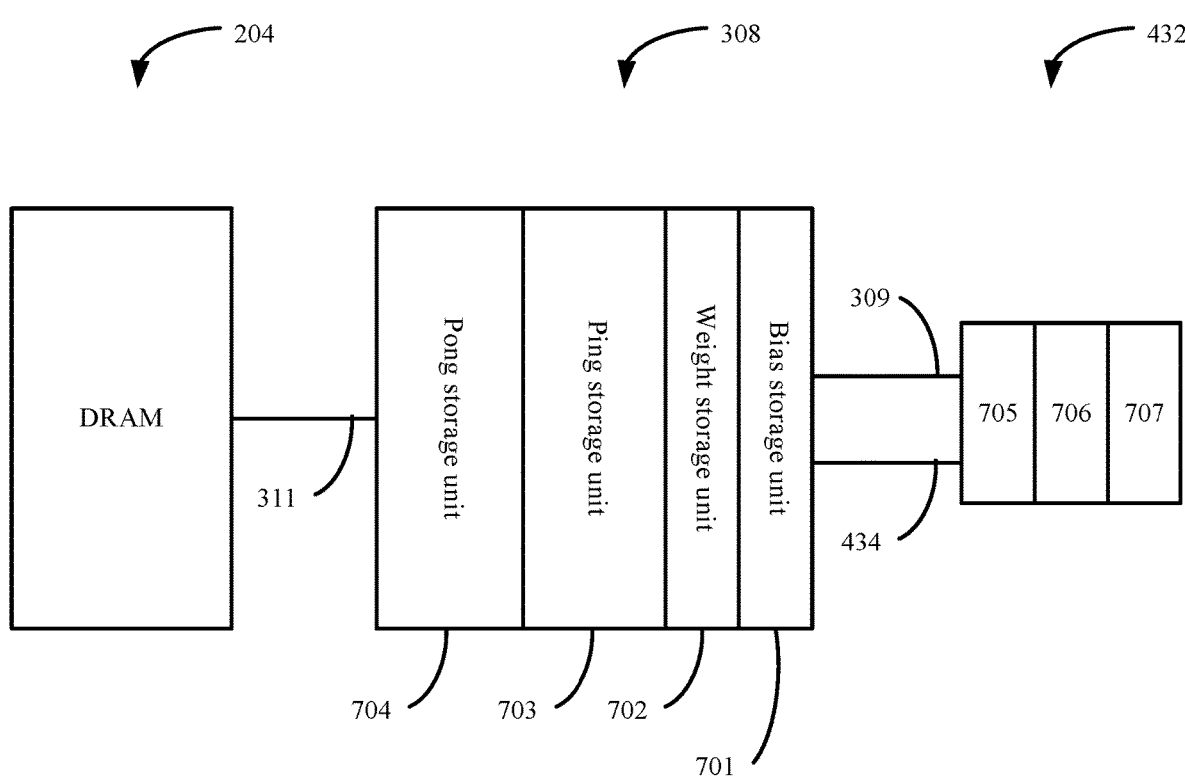
FIG. 7B is a structural diagram of another policy for moving a weight according to an embodiment of the present disclosure.

Another policy is shown in FIG. 7B. The SRAM 308 is also divided into four pieces of space, while the WRAM 432 is divided into a plurality of pieces of storage space, three of which are exemplarily shown in the figure, which are first storage space 705, second storage space 706, and third storage space 707, respectively.

In the first-layer load phase 601, the GDMA 311 loads the j-th on-chip unit map from the DRAM 204 to the ping storage unit 703 and also loads the i-th sub-weight from the DRAM 204 to the weight storage unit 702. In the first-layer compute phase 602, the broadcast bus 309 broadcasts the i-th sub-map to the NRAM 431 and also broadcasts the i-th sub-weight to the first storage space 705 in the second-layer load phase 604. The operation unit 42 computes the i-th intermediate result in the second-layer compute phase 605 according to the i-th sub-map and the i-th sub-weight. Simultaneously, the broadcast bus 309 broadcasts the i+1-th sub-map in the j-th on-chip unit map from the SRAM 308 to the NRAM 431 in the second-layer load phase 613. At the same time, the GDMA 311 loads the i+1-th sub-weight from the DRAM 204 to the weight storage unit 702, and the i-th sub-weight in the weight storage unit 702 is overwritten by the i+1-th sub-weight.

After the i+1-th sub-weight is loaded into the weight storage unit 702, no matter whether the i-th intermediate result is computed, the broadcast bus 309 broadcasts the i+1-th sub-weight from the weight storage unit 702 to the second storage space 706. Since the i-th sub-weight is stored in the first storage space 705, the i-th sub-weight is not overwritten by the i+1-th sub-weight, so the correctness of the i-th intermediate result is not affected.

In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431.

At the same time, the GDMA 311 loads the i+2-th sub-weight from the DRAM 204 to the weight storage unit 702, and the i+1-th sub-weight in the weight storage unit 702 is overwritten by the i+2-th sub-weight.

After the i+2-th sub-weight is loaded into the weight storage unit 702, no matter whether the i+1-th intermediate result is computed, the broadcast bus 309 broadcasts the i+2-th sub-weight from the weight storage unit 702 to the third storage space 707. The i+1-th sub-weight is not overwritten, so the correctness of the i+1-th intermediate result is not affected.

In this policy, the WRAM 432 is divided into a plurality of pieces of storage space, so the sub-weight is not required to wait for a previous intermediate result to be completed before being broadcast; in other words, the sub-weight may be broadcast to the WRAM 432 at the same time as the previous intermediate result is computed, shortening pipeline running time.

Figure 7C:
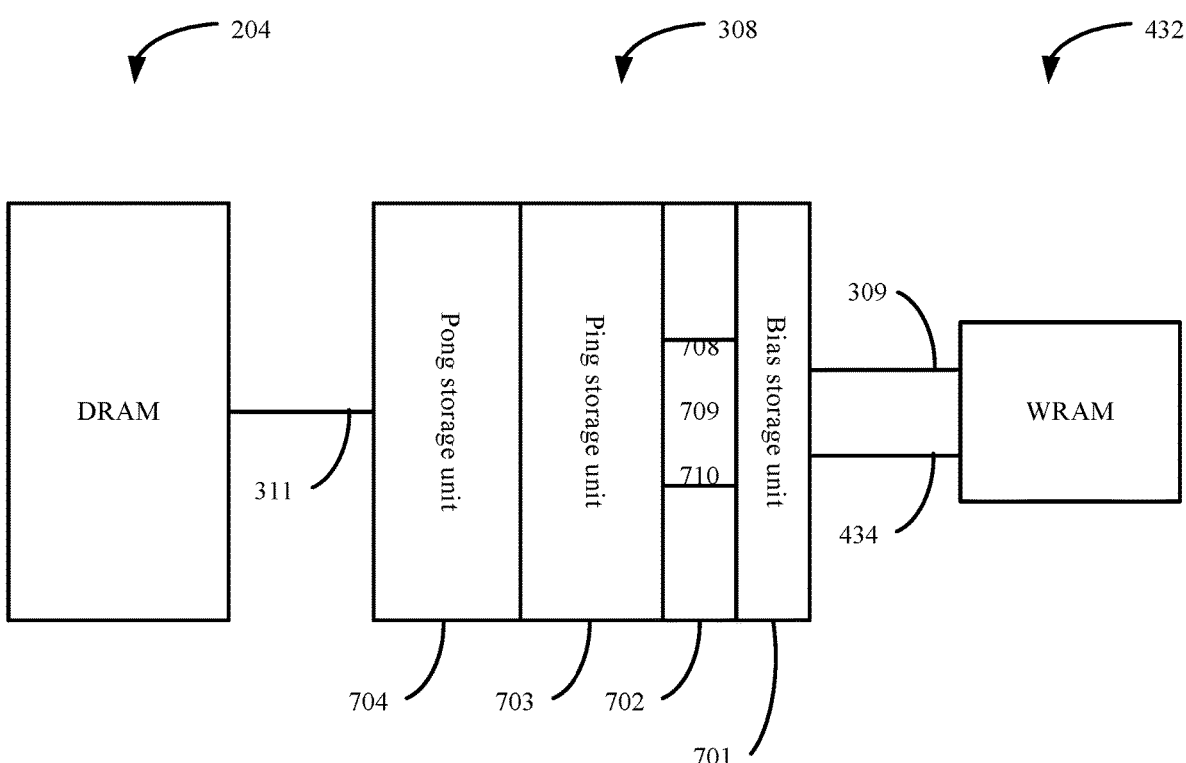
FIG. 7C is a structural diagram of another policy for moving a weight according to an embodiment of the present disclosure.

Another policy is shown in FIG. 7C. Different from FIG. 7A, the weight storage unit 702 is divided into a plurality of pieces of storage space, three of which are exemplarily shown in the figure, which are first storage space 708, second storage space 709, and third storage space 710, respectively.

In the first-layer load phase 601, the GDMA 311 loads the j-th on-chip unit map from the DRAM 204 to the ping storage unit 703. The GDMA 311 also loads the i-th sub-weight from the DRAM 204 to the first storage space 708, loads the i+1-th sub-weight from the DRAM 204 to the second storage space 709, and loads the i+2-th sub-weight from the DRAM 204 to the third storage space 710. In the first-layer compute phase 602, the broadcast bus 309 broadcasts the i-th sub-map in the j-th on-chip unit map and the i-th sub-weight from the SRAM 308 to the NRAM 431 and the WRAM 432 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map in the on-chip unit map from the SRAM 308 to the NRAM 431 in the second-layer load phase 613.

After the i-th intermediate result is generated, the broadcast bus 309 broadcasts the i+1-th sub-weight from the second storage space 709 to the WRAM 432. Since the WRAM 432 is a whole block of storage space, the i-th sub-weight is overwritten by the i+1-th sub-weight. In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. After the i+1-th intermediate result is generated, the broadcast bus 309 broadcasts the i+2-th sub-weight from the third storage space 710 to the WRAM 432. The i+1-th sub-weight in the WRAM 432 is overwritten by the i+2-th sub-weight.

In this policy, a plurality of sub-weights may be loaded into the SRAM 308 together with the on-chip unit map at a time. Since on-chip and off-chip input/output access is a bottleneck of operation efficiency, the weight storage unit 702 is divided into a plurality of pieces of storage space to store different sub-weights respectively. Although the plurality of pieces of storage space occupy more storage space of the SRAM 308, the plurality of pieces of storage space still greatly help to reduce the input/output access.

Figure 7D:
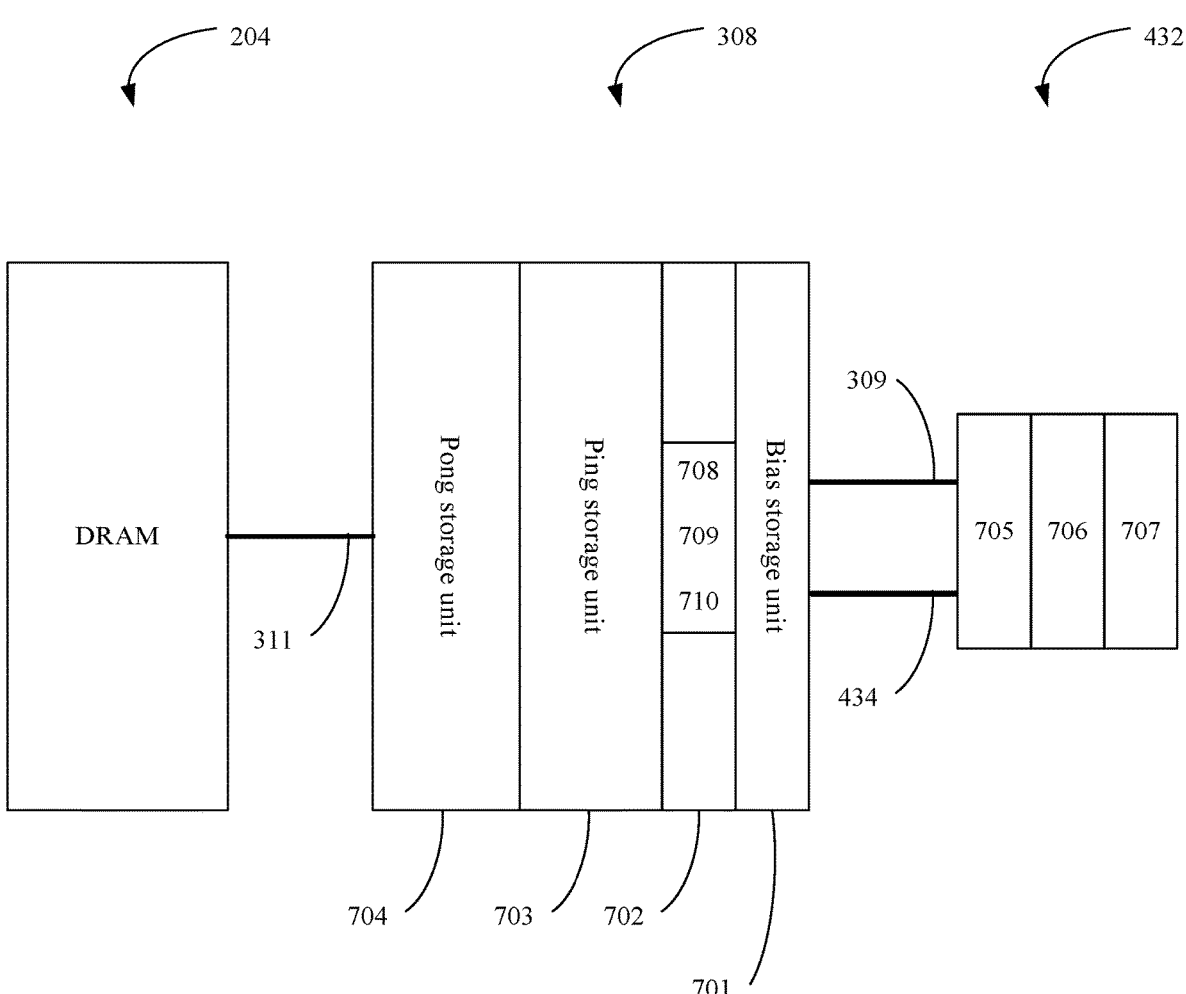
FIG. 7D is a structural diagram of another policy for moving a weight according to an embodiment of the present disclosure.

Another policy is shown in FIG. 7D. The weight storage unit 702 is divided into a plurality of pieces of storage space, and the WRAM 432 is divided into a plurality of pieces of storage space.

In the first-layer load phase 601, the GDMA 311 loads the j-th on-chip unit map from the DRAM 204 to the ping storage unit 703. The GDMA 311 also loads the i-th sub-weight from the DRAM 204 to the first storage space 708, loads the i+1-th sub-weight from the DRAM 204 to the second storage space 709, and loads the i+2-th sub-weight from the DRAM 204 to the third storage space 710. In the first-layer compute phase 602, the broadcast bus 309 broadcasts the i-th sub-map in the j-th on-chip unit map and the i-th sub-weight from the SRAM 308 to the NRAM 431 and the WRAM 432 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map in the j-th on-chip unit map from the SRAM 308 to the NRAM 431 in the second-layer load phase 613.

After the i+1-th sub-weight is loaded into the second storage space 709, no matter whether the i-th intermediate result is computed, the broadcast bus 309 broadcasts the i+1-th sub-weight from the second storage space 709 to the second storage space 706. Since the i-th sub-weight is stored in the first storage space 705, the i-th sub-weight is not overwritten by the i+1-th sub-weight, so the correctness of the i-th intermediate result is not affected. In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. No matter whether the i+1-th intermediate result is computed, the broadcast bus 309 broadcasts the i+2-th sub-weight from the third storage space 710 to the third storage space 707. The i+1-th sub-weight is not overwritten, so the correctness of the i+1-th intermediate result is not affected.

In this policy, not only may the plurality of sub-weights be loaded into the SRAM 308 together with the on-chip unit map at a time, but also the sub-weights are not required to wait for a previous computing result to be completed before being broadcast. In other words, the sub-weights may be broadcast to the WRAM 432 at the same time as the previous intermediate result is computed, shortening input/output and pipeline running time simultaneously.

As described earlier, in performing deep learning computing at each layer, a lot of off-chip and on-chip accesses are required. Especially, data is read from the DRAM 204 to the computing apparatus 201, and then a computing result of the computing apparatus 201 is stored to the DRAM 204. This kind of frequent access consumes a lot of hardware resources. In practice, adjacent layers of a neural network are fused, which reduces off-chip and on-chip data transfer to a large extent.

Figure 8:
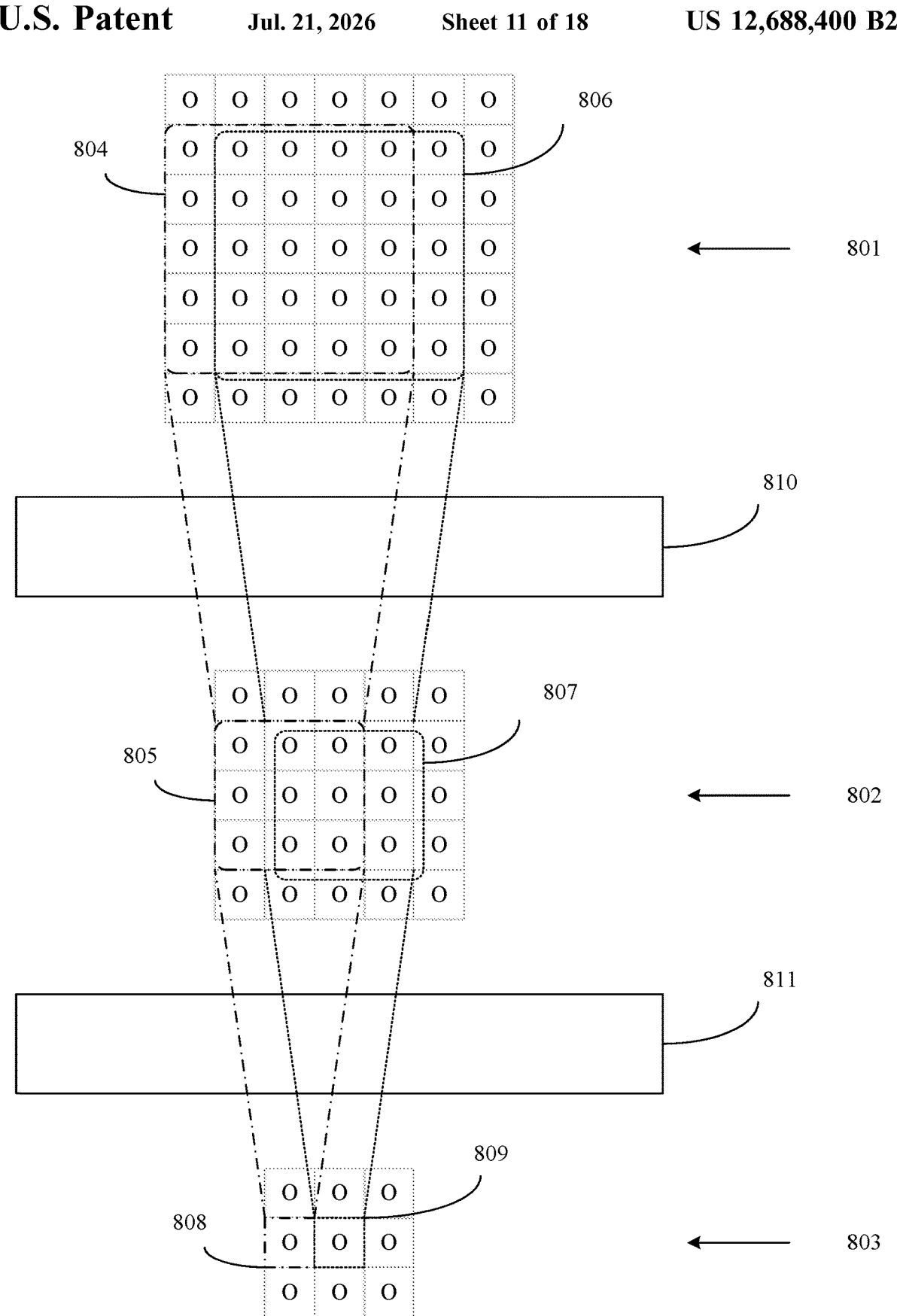
FIG. 8 is a schematic diagram that two convolution layers are fused together according to an embodiment of the present disclosure.

FIG. 8 is a schematic diagram that two convolution layers are fused together. An input of a first-layer convolution layer 810 is a 7×7 feature map 801. After this layer convolves the feature map 801 with a 3×3 kernel (which is not shown), a feature map 802 of the first-layer convolution layer 810 is obtained. A value of a 5×5 feature sub-map 804 may affect a 3×3 feature sub-map 805. Assuming that a stride is 1, after computing the 5×5 feature sub-map 804, the first-layer convolution layer 810 continues to compute a 5×5 feature sub-map 806. However, a value of the 5×5 feature sub-map 806 may affect a 3×3 feature sub-map 807.

In performing computing of a second-layer convolution layer 811, the feature map 802 becomes an input of the second-layer convolution layer 811. Similarly, after the feature map 802 is convolved with the 3×3 kernel, a feature map 803 of the second-layer convolution layer 811 is obtained. A value of the 3×3 feature sub-map 805 may affect a 1×1 feature sub-map 808 in the feature map 803. After computing the 3×3 feature sub-map 805, the second-layer convolution layer 811 continues to compute the 3×3 feature sub-map 807. However, a value of the 3×3 feature sub-map 807 may affect a 1×1 feature sub-map 809 in the feature map 803.

If the layers are not fused, in performing computing of the first-layer convolution layer 810, the computing apparatus 201 reads the 5×5 feature sub-map 804 from the DRAM 204. After the computing, the computing apparatus 201 stores the 3×3 feature sub-map 805 back to the DRAM 204. Next, the computing apparatus 201 reads the 5×5 feature sub-map 806 from the DRAM 204. After the computing, the computing apparatus 201 stores the 3×3 feature sub-map 807 to the DRAM 204. In performing computing of the second-layer convolution layer 811, similarly, it is required to read the 3×3 feature sub-map 805 from the DRAM 204. After the computing, it is required to store the 1×1 feature sub-map 808 to the DRAM 204. Next, it is required to read the 3×3 feature sub-map 807 from the DRAM 204. After the computing, it is required to store the 1×1 feature sub-map 809 to the DRAM 204. It may be known from the above explanation that the feature map 802, as intermediate data, is read and stored repeatedly on the chip and off the chip, which extremely occupies system resources.

If the first-layer convolution layer 810 and the second-layer convolution layer 811 are fused, which means to store the feature map 802 to the NRAM 431, the number of times of accesses between the computing apparatus 201 and the DRAM 204 may be reduced, thereby improving execution efficiency of the whole neural network. Since the feature maps (such as the feature map 801, the feature map 802, and the feature map 803) involved in fusion look like an inverted pyramid as a whole in the context logic of the neural network model, the fusion is called a pyramid fusion.

The following attempts to illustrate a pyramid fusion related to the present disclosure by using a fusion method. This fusion method is implemented by using hardware structures of FIG. 1, FIG. 2, FIG. 3, and FIG. 4 described above. This kind of fusion is called a template fuse unit (TFU). The template fuse unit mainly fuses a plurality of layers into one layer flexibly through a certain fusion policy, so as to reduce input/output overheads of the network. The collection of these fused layers is called the template fuse unit and may be viewed as a new layer or a self-defined layer.

This fusion method loads a feature map required by the template fuse unit from the DRAM 204 to the SRAM 308 on the chip at a time. After the feature map is loaded into the SRAM 308, the feature map is called an on-chip unit map. The on-chip unit map is divided into sub-maps. One sub-map is loaded from the SRAM 308 to the NRAM 431 of the processor core 306 assigned to compute this sub-map every time, and a weight required for computing this sub-map is also loaded from the SRAM 308 to the WRAM 432 at the appropriate time. After each sub-map is computed, a corresponding intermediate result is obtained. The intermediate result is stored back to the SRAM 308. After all the sub-maps are computed, computing results are stored back to the DRAM 204 at a time. In other words, a corresponding result obtained through an operation of an operator in the neural network model by the on-chip unit map and the weight is transferred between the DRAM 204 and the SRAM 308. An output (an intermediate result) corresponding to the sub-map is transferred between the SRAM 308 and the NRAM 431. From the perspective of the computing apparatus 201, the loading of the feature map of the template fuse unit is in units of on-chip unit maps, while the computing of the template fuse unit is in units of sub-maps.

More specifically, the SRAM 308 is one of important reference indexes of the fusion policy. A size of space of the SRAM 308 determines whether the template fuse unit is a large map mode or a small map mode. The small map mode and the large map mode refer to whether a feature map stored in the DRAM 204 may be moved to the SRAM 308 for processing at a time. The processing apparatus 203 compares storage space required by the feature map with available space of the SRAM 308. If the space of the SRAM 308 is insufficient to accommodate the feature map, the template fuse unit is the large map mode. If the space of the SRAM 308 is large enough to accommodate the entire feature map, the template fuse unit is the small map mode. It is required to be noted that the on-chip unit map is just a part of the feature map in the large map mode, while in the small map mode, if the available space of the SRAM 308 is large enough, or the feature map is small enough, the SRAM 308 may be possible to accommodate a plurality of feature maps at a time. In other words, the on-chip unit map may include the plurality of feature maps.

If the template fuse unit is in the large map mode, the feature map must be split before the feature map may be loaded into the computing apparatus 201. The processing apparatus 203 splits the feature map in the DRAM 204 until an on-chip unit map that is small enough to meet the space requirements of the SRAM 308 is generated, so that the on-chip unit map may be moved to the SRAM 308 for processing at a time. When the feature map is split, an input-dependent operation and an output-dependent operation may be generated.

The input-dependent operation means that on-chip unit maps after splitting are at least partly overlapped, and each sub-set requires some additional copies of inputs to perform a complete operation, resulting in data redundancy during a split operation. The so-called data redundancy means that the same segment of data is reused in the system. When the template fuse unit includes a convolution layer, a pooling layer, or a matrix multiplication layer, the input-dependent operation is generated.

The output-dependent operation means that, after each sub-map produces an intermediate result, reduction is also required to obtain computing results. Reduction refers to splitting the on-chip unit map into sub-maps to perform computing respectively based on the understanding of the content of the on-chip unit map itself, so as to reduce the scale of computing. As such, on the premise of keeping the original appearance of the on-chip unit map as much as possible, the amount of data is reduced to the maximum extent, and then, the computing results are restored or integrated based on the sub-maps. The computing results are mutually dependent during the reduction. When the template fuse unit includes an inner product layer, a convolution layer, a matrix multiplication layer, a sorting layer, and a counting layer, the output-dependent operation is generated.

Data formats of the feature map include N, H, W, and C dimensions, where N represents batch, H represents height, W represents width, and C represents channel. Taking image data as an example, N represents the number of images in the batch; H represents the number of pixels of this image in the vertical direction; W represents the number of pixels of this image in the horizontal direction; and C represents the number of channels (for example, the number of channels C of a black-and-white image is 1, and the number of channels C of a red-green-blue (RGB) color image is 3).

Figure 9:
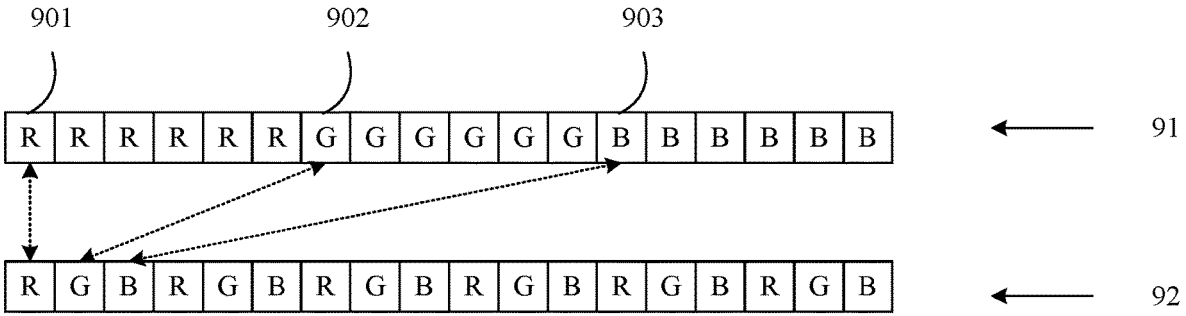
FIG. 9 is a diagram of formats of NCHW and NHWC.

The ordering of these dimensions determines how the data is composed. Common composition methods include NHWC and NCHW. FIG. 9 shows format differences between NCHW and NHWC. This figure takes an RGB color image as an example. In the figure, R represents a red pixel, G represents a green pixel, and B represents a blue pixel. A sequence 91 is in the NCHW format. N is arranged in the outer layer. Pixels in each channel are close together and then arranged in an order of RGB. An offset of an element whose coordinates are (n, c, h, w) in storage is $((n \times C+c) \times H+h) \times W+w$. A sequence 92 is in the NHWC format. C is arranged in the innermost layer. RGB pixels of space positions corresponding to a plurality of channels are close together. The figure also shows positions of an input pixel 901, an input pixel 902, and an input pixel 903 in different arrangements. However, the input pixel 901, the input pixel 902, the input pixel 903 together are the color of a point in the image. A conversion method for a coordinate offset corresponding to an element whose coordinates are (n, c, h, w) is $((n \times H+h) \times W+w) \times C+c$. First, the NHWC is closer to an image data storage format of a bitmap (BMP) than the NCHW. A file in the BMP format stores data pixel by pixel, and each pixel stores color values of all channels, which makes it unnecessary to perform additional dimension conversions when an input image is read. Therefore, the NHWC has better memory access locality, and one output pixel is obtained for every three input pixels. However, the NCHW obtains a final output result only after all channel inputs are ready, which requires large cache space.

Figure 10:
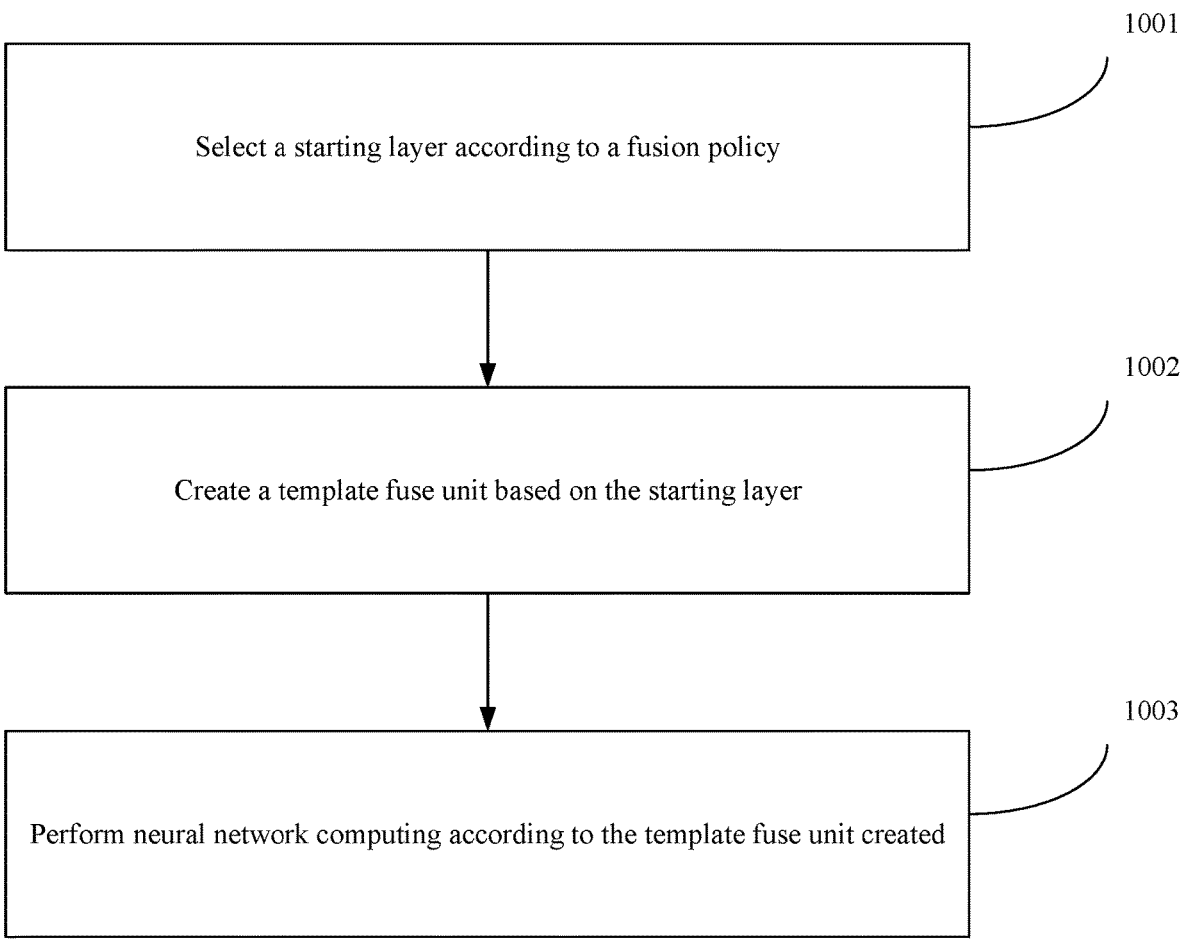
FIG. 10 is a flowchart of dynamically fusing a neural network according to a fusion policy according to an embodiment of the present disclosure.

FIG. 10 is a flowchart of this fusion method.

In a step 1001, a starting layer of a template fuse unit is selected according to a starting rule of a fusion policy. The processing apparatus 203 selects the starting layer of the template fuse unit according to the starting rule of the fusion policy. In other words, the processing apparatus 203 selects a layer that starts to fuse among unfused layers in a neural network.

In an application scenario, the starting rule is that the starting layer is a top unfused layer in the neural network. The processing apparatus 203 searches for the top unfused layer. In another application scenario, considering that a convolution layer and a pooling layer consume the most input/output resources, the starting rule is that the starting layer is a top unfused convolution or pooling layer. The processing apparatus 203 first finds all convolution and pooling layers of unfused layers in the neural network model and then starts to fuse from the top unfused convolution or pooling layer.

In a step 1002, a fusion is performed based on the starting layer, and all rules of the fusion policy are checked one by one to create the template fuse unit. The processing apparatus 203 performs the fusion based on the starting layer and checks all the rules of the fusion policy one by one to create the template fuse unit. On the premise that all the rules are satisfied, hardware resources of the computing apparatus 201 are sufficient to load an on-chip unit map required for computing the template fuse unit at a time and then perform neural network computing according to the template fuse unit. In addition to the starting rule, the fusion policy may also exemplarily include following rules.

Rule 1: Backward Fusion

The backward fusion refers to a fusion from a starting layer to a direction of neural network model inference; in other words, the backward fusion refers to a fusion in a direction of layer 1→layer 2→layer 3. If there are unfused layers before the starting layer, under this rule, these unfused layers will not be considered to be incorporated into the template fuse unit.

Rule 2: Priority to Forward Fusion

The forward fusion refers to a fusion from a starting layer to a reverse direction of neural network inference; in other words, the forward fusion refers to a fusion in a direction of layer 3→layer 2→layer 1. This rule is usually matched with the aforementioned starting rule that the starting layer is the top unfused convolution or pooling layer. The reason is that there may be unfused layers before the convolution or pooling layer. After selecting the starting layer, the processing apparatus 203 preferentially fuses forward to try to incorporate the unfused layers before the starting layer into the template fuse unit. Assuming that layers 1 to 2 are fused, the processing apparatus 203 founds that the top unfused convolution or pooling layer is layer 5. Therefore, the starting layer is the layer 5, and the processing apparatus 203 preferentially forward fuses layer 4 and layer 3. If the fusion continues, the processing apparatus 203 then backward fuses layer 6 and layer 7, and the like.

Rule 3: Single-Branch Output

The fusion policy of this fusion method does not support that the template fuse unit is a multi-output network. The reason is that shape derivation implemented inside the template fuse unit mainly adopts a derivation form from back to front. The multi-output network means that it is required to forward derive respectively from different outputs, and results of the derivation do not necessarily come down to the same feature map, so that the results may not be converged.

Rule 4: Including at Least Two Main Layers

When layer logic is too simple, performance of the template fuse unit is not as good as performance of unfused layers. Therefore, when the layer logic is used as the fusion policy, the processing apparatus 203 evaluates whether an operation of each fused layer is complicated enough to enable the fusion to produce benefits. In order to produce benefits, it is required to incorporate a main layer into the template fuse unit as much as possible. The main layer refers to a layer that consumes a lot of input/output resources, such as a matrix multiplication layer, a pooling layer, or a convolution layer. Here, the pooling includes various kinds of pooling, such as maximum pooling (maxpool) or mean pooling (avgpool). The convolution also includes various kinds of convolution, such as ordinary convolution, convolution with a mean, depthwise convolution (depthwise conv), and the like. This rule is that the template fuse unit includes at least two main layers. When the processing apparatus 203 judges that this rule is not satisfied, the processing apparatus 203 adjusts the template fuse unit until this rule is satisfied.

Rule 5: Including a Continuous Structure in which a Main Layer, a Main Layer, and a Non-Main Layer are Successively Adjacent This rule is that the template fuse unit is required to include a continuous structure of the main layer, the main layer, and the non-main layer. In other words, the template fuse unit is required to include the continuous structure in which the main layer, the main layer, and the non-main layer are successively adjacent. Such operations are complicated enough to enable the fusion to produce the benefits. When the processing apparatus 203 judges that this rule is not satisfied, the processing apparatus 203 adjusts the template fuse unit until this rule is satisfied.

Rule 6: A Weight of a Convolution Layer is not Shared with any Layer of a Neural Network Since a weight of an operator in a neural network model involved in the template fuse unit has a special arrangement form, when a fused convolution operator shares a weight with other operators, there is a conflict in the arrangement logic of the weight. This rule is that the weight of the convolution operator in the template fuse unit is not shared with any layer of the neural network. When the processing apparatus 203 judges that this rule is not satisfied, the processing apparatus 203 removes this convolution operator from the template fuse unit.

Rule 7: A Weight is not Larger than Available Space of a WRAM

In a small map mode, an on-chip unit map may include a plurality of feature maps. In this situation, required weights will be increased, and whether available space of the WRAM 432 is sufficient should be evaluated more carefully. This rule is that storage space required by the weight of the on-chip unit map is not larger than the available space of the WRAM 432. When the processing apparatus 203 judges that this rule is not satisfied, the processing apparatus 203 reduces a size of the on-chip unit map. If the WRAM 432 is split into a plurality of pieces of storage space, this rule is that storage space required by sub-weights is not larger than available space of weight storage space.

Rule 8: Redundancy Percentage

The redundancy percentage refers to a ratio of a sum of redundancy generated by an input-dependent operation and an output-dependent operation to the amount of normal input/output of the template fuse unit. Here, the amount of normal input/output refers to the amount of data of the on-chip unit map without redundancy before splitting. The processing apparatus 203 computes a percentage of the amount of memory access $\text{size}_{TFU}$ of the on-chip unit map from the DRAM 204 to the SRAM 308 to the amount of normal input/output (excluding redundancy) $\text{size}_{ori}$ after the template fuse unit fuses a current layer. Here, the amount of memory access $\text{size}_{TFU}$ refers to the theoretical amount of memory access $\text{size}_{ori}$ plus the sum of redundancy. The formula is as follows:

$$\frac{(\text{size}_{TFU} - \text{size}_{ori})}{\text{size}_{ori}} \times 100\% \geq \text{percentage threshold.}$$

The processing apparatus 203 takes into account split information and shape derivation of the template fuse unit and sets the percentage threshold to 50%, 75%, 100%, 125%, or 150%, and preferably, the processing apparatus 203 sets the percentage threshold to 100%. Take a case where the percentage threshold is 100% as an example, it is represented that the fusion is not performed when the sum of redundancy is more than twice of the amount of normal input/output of the template fuse unit. This rule is that a sum of redundancy generated by splitting the on-chip unit map does not exceed a specific proportion associated with the percentage threshold. Once the sum of redundancy generated by splitting the on-chip unit map exceeds the specific proportion associated with the percentage threshold, it is represented that there are too many redundant parts, and a lot of resources are spent on computing redundancy, thus reducing efficiency. Therefore, when the processing apparatus 203 judges that this rule is not satisfied, the processing apparatus 203 stops the fusion.

It should be noted that, in the small map mode, since at least one complete feature map is loaded at a time from the DRAM 204 to the SRAM 308, there is no redundancy. This rule is not applicable to the small map mode.

Rule 9: Input and Output Sizes of an On-Chip Unit Map

Assuming that a size of space of the SRAM 308 is S, storage space required by the on-chip unit map is IN, and storage space required by computing results of the on-chip unit map is OUT, then, this rule is that the size of the space of the SRAM 308 is required to satisfy following conditions.

If IN and OUT may not reuse the storage space, IN+OUT<S.

If IN and OUT may reuse the storage space, MAX(IN, OUT)<S.

In other words, if IN and OUT may not reuse the storage space, a sum of the storage space of the on-chip unit map and the storage space of the computing results is smaller than the available space of the SRAM 308; and if IN and OUT may reuse the storage space, the larger of the storage space of the on-chip unit map and the storage space of the computing results is smaller than the available space of the SRAM 308.

If the SRAM 308 is split into ping storage space and pong storage space, this rule is that the sum of the storage space of the on-chip unit map and the storage space of the computing results of the on-chip unit map is smaller than available space of the ping storage space or the pong storage space.

Rule 10: Storage Space Required by Sub-Maps is not Larger than Available Space of an NRAM This rule is that the storage space required by the sub-maps is not larger than the available space of the NRAM 431. When the on-chip unit map in the SRAM 308 is to be split into sub-maps and moved to the NRAM 431, the processing apparatus 203 may perform fine-grained splitting in N, H, and W dimensions. If the space of the NRAM 431 is not enough, the processing apparatus 203 splits the on-chip unit map more finely until this rule is satisfied. Generally speaking, the NRAM 431 has reasonable available space, so that the on-chip unit map may be loaded at a time as the on-chip unit map is split to a reasonable degree. From the perspective of the fusion policy, the template fuse unit is not affected by the number of batches. However, the more finely the on-chip unit map is split (the more sub-maps there are), the processing speed will be decreased, so the processing apparatus 203 is required to evaluate the space of the NRAM 431.

In some embodiments, the space of the SRAM 308 corresponds to the number of NRAMs 431 of the processing cores 306 in the cluster 305. For example, the cluster 305 includes four processor cores 306, and then the space of the SRAM 308 is four times of the space of the NRAM 431. In other words, in the large map mode, the on-chip unit map may generally be allocated to four processor cores 306 for processing. This kind of architecture design has considered that data that is loaded into the SRAM 308 may be allocated to all NRAMs 431 at a time. Therefore, this rule is not required to be considered in the large map mode.

Rule 11: Stride Redundancy

The stride redundancy means that, when the template fuse unit fuses too many layers, and the lengths and widths of kernels of the convolution layer and the pooling layer are larger than strides, there is an overlap between input data required by each output point, which is the aforementioned input-dependent operation. This overlap is the stride redundancy. The stride redundancy makes each processor core 306 be required to read more data. However, this part of reused data may occupy on-chip and off-chip access resources. The more layers the template fuse unit includes, the more serious the stride redundancy is. This rule is that a sum of difference values between side lengths of the kernel of the convolution layer or the pooling layer and strides is not greater than a redundancy threshold.

The definition of the redundancy threshold is as follows. Assuming that the length and width of the kernel of the convolution layer and the pooling layer are $k_x$ and $k_y$, and strides in the length and width directions are $s_x$ and $s_y$, respectively, and then stride redundancy in the length direction is a sum of $k_x$-$s_x$ of all convolution and pooling layers in the template fuse unit. Similarly, stride redundancy in the width direction is a sum of $k_y$-$s_y$ of all the convolution and pooling layers in the template fuse unit. The redundancy threshold of this embodiment may be 3, 4, 5, or 6, and preferably, the redundancy threshold may be 4. This rule is not satisfied as long as the stride redundancy in either of the length or width directions is greater than the redundancy threshold. The processing apparatus 203 adjusts the template fuse unit. Usually, the processing apparatus 203 decreases the number of layers that are fused until this rule is satisfied.

The fusion policy provides an exception rule for the stride redundancy. If there are multiple branches in the layer to be fused and the template fuse unit may fuse the whole multiple branches, the performance of the template fuse unit may be better. In this situation, the processing apparatus 203 ignores the rule for the stride redundancy, which means that the stride redundancy does not restrict the template fuse unit to fuse the multiple branches. In other words, in the fusion policy of this embodiment, fusing the multiple branches takes precedence over the restriction of the stride redundancy. In other words, the stride redundancy is only considered in the case of a single branch.

The above rules are only examples. The present disclosure does not restrict the order in which each rule is performed or the fact that these rules are required to be considered simultaneously. Those skilled in the art may add or delete the rules according to actual situations in different application scenarios, so as to implement a fusion policy that meets a current application scenario.

Going back to FIG. 10, in a step 1003, neural network computing is performed according to the template fuse unit created. The computing apparatus 201, based on a three-level operation hierarchy of system on chip-cluster-processor core, in combination with three-level memory design of DRAM-SRAM-NRAM/WRAM, takes the template fuse unit as a self-defined layer in the neural network and loads the on-chip unit map required for computing the template fuse unit from the DRAM 204 to the SRAM 308 at a time. As such, data may be cached and computed at appropriate levels, thereby forming sufficient pipelining. After computing, the computing apparatus 201 sends computing results from the SRAM 308 to the DRAM 204, which greatly reduces input/output overheads in the neural network computing.

When input data from fields such as computer vision, speech, natural language processing, and data mining is used to perform various deep learning algorithms and various machine learning algorithms, the present disclosure, based on the template fuse unit, may reduce the input/output overheads in the neural network computing. Another embodiment of the present disclosure shows a method of performing neural network computing by using a template fuse unit.

More specifically, this embodiment also adopts a three-level pipeline with two layers shown in FIG. 6. In this embodiment, an on-chip unit map is an input map of the template fuse unit, and a weight refers to a weight required for computing the input map. As described earlier, in the large map mode, the on-chip unit map is only a part of one feature map; in the small map mode, the on-chip unit map includes at least one feature map. This embodiment also has multiple policies for moving a weight shown in FIG. 7.

A policy is shown in FIG. 7A. The weight storage unit 702 is a complete block of storage space, and the WRAM 432 is a complete block of storage space. In the first-layer load phase 601, the GDMA 311 loads an input (the on-chip unit map) of the template fuse unit from the DRAM 204 to the ping storage unit 703 and also loads the i-th sub-weight (corresponding to the i-th sub-map of the on-chip unit map) in the weight from the DRAM 204 to the weight storage unit 702. In the first-layer compute phase 602, the broadcast bus 309 broadcasts the i-th sub-map in the on-chip unit map and the i-th sub-weight from the SRAM 308 to the NRAM 431 and the WRAM 432 of at least one of the plurality of processor cores 306 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map in the on-chip unit map from the SRAM 308 to the NRAM 431 in the second-layer load phase 613. Since the i-th sub-weight has been loaded into the WRAM 432, the space of the weight storage unit 702 may be freed up. Therefore, at the same time, the GDMA 311 loads the i+1-th sub-weight (corresponding to the i+1-th sub-map) in the weight from the DRAM 204 to the weight storage unit 702. Since the weight storage unit 702 is a whole block of storage space, the i-th sub-weight in weight storage unit 702 is overwritten by the i+1-th sub-weight.

After the i-th intermediate result is generated, the broadcast bus 309 broadcasts the i+1-th sub-weight from the weight storage unit 702 to the WRAM 432. Since the WRAM 432 is also a whole block of storage space, the i-th sub-weight is also overwritten by the i+1-th sub-weight.

In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. At the same time, the GDMA 311 loads the i+2-th sub-weight (corresponding to the i+2-th sub-map) in the weight from the DRAM 204 to the weight storage unit 702, and the i+1-th sub-weight in the weight storage unit 702 is overwritten by the i+2-th sub-weight.

After the i+1-th intermediate result is generated, the broadcast bus 309 broadcasts the i+2-th sub-weight from the weight storage unit 702 to the WRAM 432. The i+1-th sub-weight in the WRAM 432 is also overwritten by the i+2-th sub-weight.

In this policy, the weight corresponding to the on-chip unit map is not loaded into the SRAM 308 together with the on-chip unit map at a time, but only the sub-weight corresponding to the sub-map is loaded into the SRAM 308 each time. Only one sub-weight is stored in the weight storage unit 702 at the same time. Therefore, the computing apparatus 201 first identifies the largest of a plurality of sub-weights and then determines a size of the weight storage unit 702 according to the largest in the sub-weights.

Such a configuration results in frequent access to the DRAM 204 during the computing of the template fuse unit, which affects the advantages of fusion, but if the space of the SRAM 308 is limited, this policy is a compromise.

Another policy is shown in FIG. 7B. The WRAM 432 is divided into a plurality of pieces of storage space. In the first-layer load phase 601, the GDMA 311 loads the input map (the on-chip unit map) of the template fuse unit from the DRAM 204 to the ping storage unit 703 and also loads the i-th sub-weight from the DRAM 204 to the weight storage unit 702. In the first-layer compute phase 602, the broadcast bus 309 broadcasts the i-th sub-map to the NRAM 431 and also broadcasts the i-th sub-weight to the first storage space 705 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map from the SRAM 308 to the NRAM 431 in the second-layer load phase 613. At the same time, the GDMA 311 loads the i+1-th sub-weight from the DRAM 204 to the weight storage unit 702, and the i-th sub-weight in the weight storage unit 702 is overwritten by the i+1-th sub-weight.

After the i+1-th sub-weight is loaded into the weight storage unit 702, no matter whether the i-th intermediate result is computed, the broadcast bus 309 broadcasts the i+1-th sub-weight from the weight storage unit 702 to the second storage space 706. Since the i-th sub-weight is stored in the first storage space 705, the i-th sub-weight is not overwritten by the i+1-th sub-weight, and the correctness of the i-th intermediate result is not affected.

In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. At the same time, the GDMA 311 loads the i+2-th sub-weight from the DRAM 204 to the weight storage unit 702, and the i+1-th sub-weight in the weight storage unit 702 is overwritten by the i+2-th sub-weight.

After the i+2-th sub-weight is loaded into the weight storage unit 702, no matter whether the i+1-th intermediate result is computed, the broadcast bus 309 broadcasts the i+2-th sub-weight from the weight storage unit 702 to the third storage space 707. The i+1-th sub-weight is not overwritten, and the correctness of the i+1-th intermediate result is not affected.

In this policy, the WRAM 432 is divided into a plurality of pieces of storage space, so the sub-weight is not required to wait for a previous intermediate result to be completed before being broadcast; in other words, the sub-weight may be broadcast to the WRAM 432 at the same time as the previous intermediate result is computed, which shortens pipeline running time.

Another policy is shown in FIG. 7C. Different from FIG. 7A, the weight storage unit 702 is divided into a plurality of pieces of storage space. In the first-layer load phase 601, the GDMA 311 loads the input map (the on-chip unit map) of the template fuse unit from the DRAM 204 to the ping storage unit 703. The GDMA 311 also loads the i-th sub-weight from the DRAM 204 to the first storage space 708, loads the i+1-th sub-weight from the DRAM 204 to the second storage space 709, and loads the i+2-th sub-weight from the DRAM 204 to the third storage space 710. In the first-layer compute phase 602, the broadcast bus 309 broadcasts the i-th sub-map and the i-th sub-weight from the SRAM 308 to the NRAM 431 and the WRAM 432 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map from the SRAM 308 to the NRAM 431 in the second-layer load phase 613.

After the i-th intermediate result is generated, the broadcast bus 309 broadcasts the i+1-th sub-weight from the second storage space 709 to the WRAM 432. Since the WRAM 432 is a whole block of storage space, the i-th sub-weight is overwritten by the i+1-th sub-weight. In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. After the i+1-th intermediate result is generated, the broadcast bus 309 broadcasts the i+2-th sub-weight from the third storage space 710 to the WRAM 432. The i+1-th sub-weight in the WRAM 432 is overwritten by the i+2-th sub-weight.

In this policy, the plurality of sub-weights may be loaded into the SRAM 308 together with the on-chip unit map at a time, thus fully realizing the advantages of fusion, which greatly contributes to operation efficiency.

Another policy is shown in FIG. 7D. The weight storage unit 702 is divided into a plurality of pieces of storage space, and the WRAM 432 is divided into a plurality of pieces of storage space. In the first-layer load phase 601, the GDMA 311 loads the input map (the on-chip unit map) required by the template fuse unit from the DRAM 204 to the ping storage unit 703. The GDMA 311 also loads the i-th sub-weight from the DRAM 204 to the first storage space 708, loads the i+1-th sub-weight from the DRAM 204 to the second storage space 709, and loads the i+2-th sub-weight from the DRAM 204 to the third storage space 710. In the first-layer compute phase 602, the broadcast bus 309 broadcasts the i-th sub-map and the i-th sub-weight from the SRAM 308 to the NRAM 431 and the WRAM 432 in the second-layer load phase 604. The operation unit 42 computes the i-th intermediate result in the second-layer compute phase 605 according to the i-th sub-map and the i-th sub-weight. At the same time, the broadcast bus 309 broadcasts the i+1-th sub-map in the on-chip unit map from the SRAM 308 to the NRAM 431 in the second-layer load phase 613.

No matter whether the i-th intermediate result is computed, the broadcast bus 309 broadcasts the i+1-th sub-weight from the weight storage unit 702 to the second storage space 706. Since the i-th sub-weight is stored in the first storage space 705, the i-th sub-weight is not overwritten by the i+1-th sub-weight, and the correctness of the i-th intermediate result is not affected. In the second-layer store phase 606, the MVDMA 434 stores the i-th intermediate result back to the ping storage unit 703. At the same time, the operation unit 42 computes the i+1-th intermediate result in the second-layer compute phase 614 according to the i+1-th sub-map and the i+1-th sub-weight. Moreover, the i+2-th sub-map enters the second-layer load phase 615, and the broadcast bus 309 broadcasts the i+2-th sub-map from the SRAM 308 to the NRAM 431. No matter whether the i+1-th intermediate result is computed, the broadcast bus 309 broadcasts the i+2-th sub-weight from the weight storage unit 702 to the third storage space 707. The i+1-th sub-weight is not overwritten, and the correctness of the i+1-th intermediate result is not affected.

In this policy, not only may the plurality of sub-weights be loaded into the SRAM 308 together with the on-chip unit map at a time, but also the sub-weight is not required to wait for the previous computing result to be completed before being broadcast. In other words, the sub-weight may be broadcast to the WRAM 432 at the same time as the previous intermediate result is computed, which shortens input/output and pipeline running time.

Figure 11:
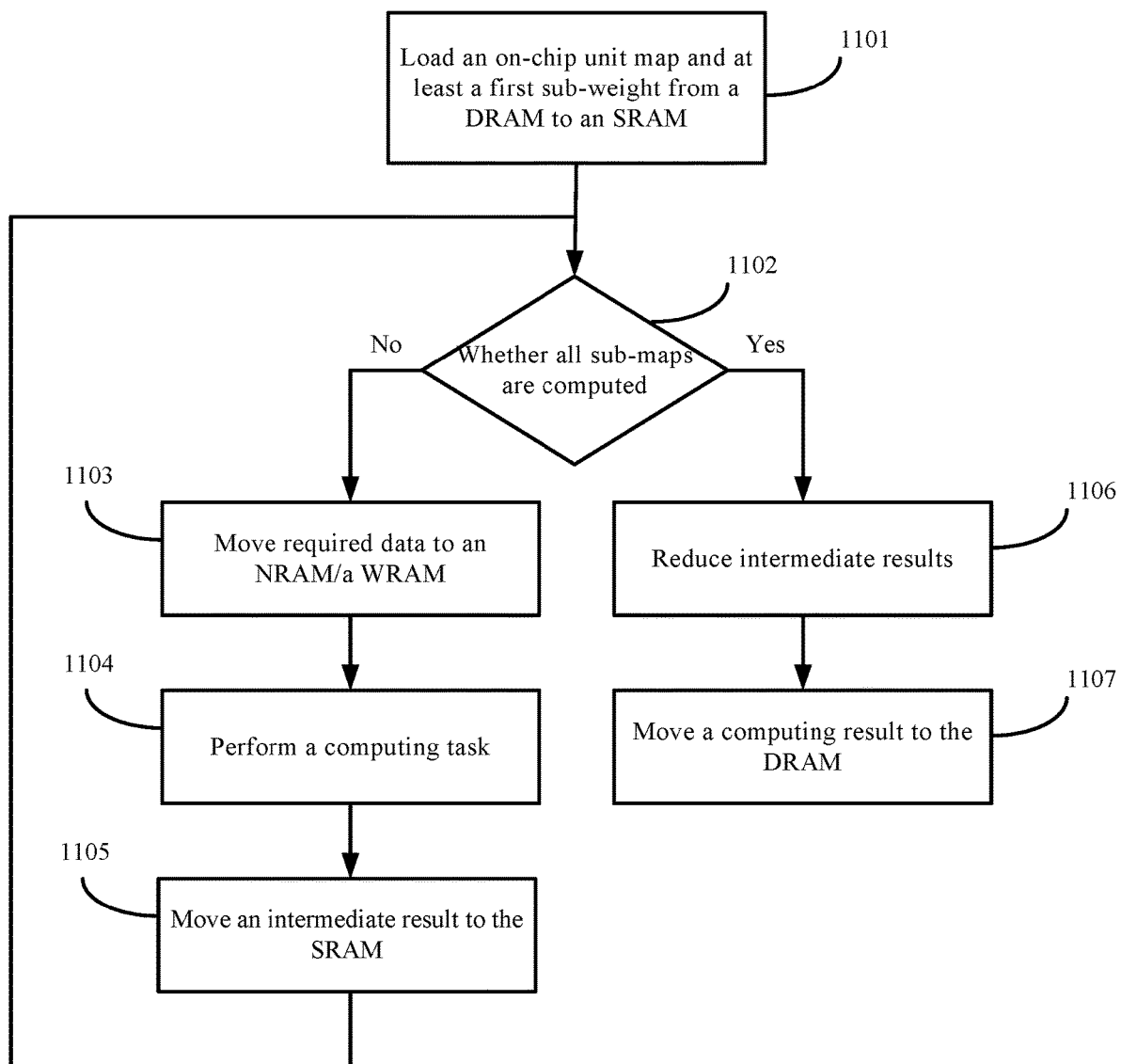
FIG. 11 is a flowchart of performing a computing program according to an embodiment of the present disclosure.

FIG. 11 is a flowchart of performing a computing program by using a computing apparatus 201 according to another embodiment.

In a step 1101, an on-chip unit map and at least a first sub-weight (corresponding to a first sub-map of the on-chip unit map) are loaded from the DRAM 204 to the SRAM 308. In a step 1102, whether all sub-maps of the on-chip unit map are computed is judged. If not all the sub-maps of the on-chip unit map are computed, a step 1103 is performed to select one uncomputed sub-map and move data required by the uncomputed sub-map to the NRAM 411 and the WRAM 432. In a step 1104, a computing task is performed. In a step 1105, a generated intermediate result is moved from the NRAM 411 to the SRAM 308, and this process goes back to the step 1102.

If it is judged that all the sub-maps are computed in the step 1102, a step 1106 is performed to reduce all intermediate results to generate a computing result. In a step 1107, the computing result is moved from the SRAM 308 to the DRAM 204.

Figure 12:
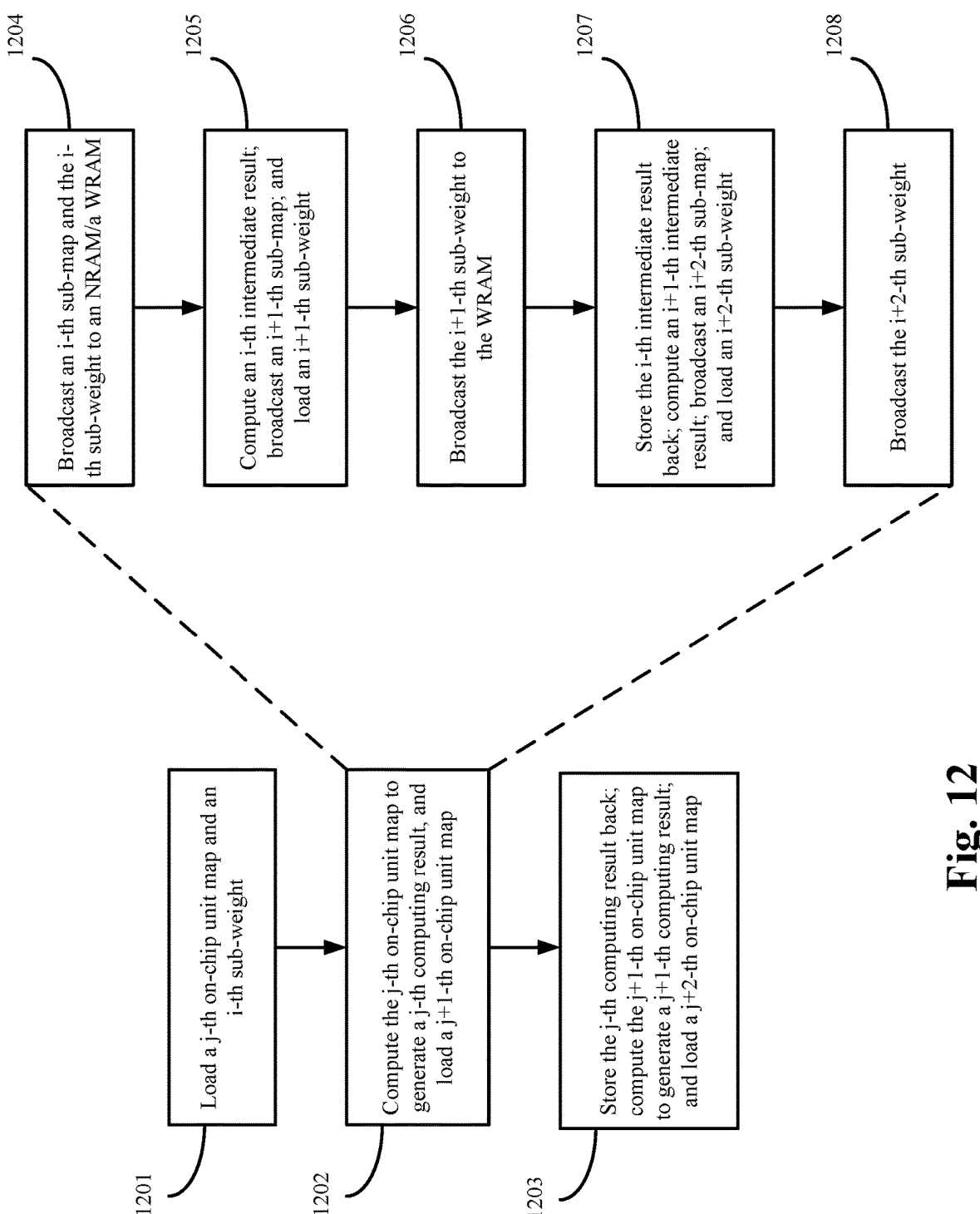
FIG. 12 is a flowchart according to a policy for moving a weight according to an embodiment of the present disclosure.

FIG. 12 is a flowchart of a three-level pipeline with two layers according to another embodiment. In a step 1201, a j-th on-chip unit map and an i-th sub-weight are loaded. In a step 1202, the j-th on-chip unit map is computed to generate a j-th computing result, and synchronously, a j+1-th on-chip unit map is loaded. In a step 1203, the j-th computing result is stored back, the j+1-th on-chip unit map is computed to generate a j+1-th computing result, and synchronously, a j+2-th on-chip unit map is loaded.

When the computing apparatus 201 has a storage space configuration shown in FIG. 7A, the step 1202 also includes following steps.

In a step 1204, an i-th sub-map in the j-th on-chip unit map and the i-th sub-weight are broadcast from the SRAM 308 to the NRAM 431 and the WRAM 432 of at least one of a plurality of processor cores 306.

In a step 1205, an i-th intermediate result is computed according to the i-th sub-map and the i-th sub-weight, and at the same time, an i+1-th sub-map in the on-chip unit map is broadcast from the ping storage unit 703 to the NRAM 431. Since the i-th sub-weight has been loaded into the WRAM 432, the space of the weight storage unit 702 may be freed up. Therefore, at the same time, an i+1-th sub-weight (corresponding to the i+1-th sub-map) in the weight is loaded from the DRAM 204 to the weight storage unit 702. The i-th sub-weight in weight storage unit 702 is overwritten by the i+1-th sub-weight.

In a step 1206, after the i-th intermediate result is acquired, the i+1-th sub-weight is broadcast from the weight storage unit 702 to the WRAM 432. Since the WRAM 432 is also a whole block of storage space, the i-th sub-weight is also overwritten by the i+1-th sub-weight.

In a step 1207, the i-th intermediate result is stored back to the ping storage unit 703; at the same time, the i+1-th intermediate result is computed according to the i+1-th sub-map and the i+1-th sub-weight; an i+2-th sub-map is broadcast from the SRAM 308 to the NRAM 431; an i+2-th sub-weight (corresponding to the i+2-th sub-map) in the weight is loaded from the DRAM 204 to the weight storage unit 702; and the i+1-th sub-weight in the weight storage unit 702 is overwritten by the i+2-th sub-weight.

In a step 1208, after the i+1-th intermediate result is acquired, the i+2-th sub-weight is broadcast from the weight storage unit 702 to the WRAM 432, and the i+1-th sub-weight in the WRAM 432 is also overwritten by the i+2-th sub-weight.

When the computing apparatus 201 has a storage space configuration shown in FIG. 7B, the step 1202 also includes steps shown in FIG. 13.

In a step 1301, an i-th sub-map is broadcast to the NRAM 431, and the i-th sub-weight is also broadcast to the first storage space 705.

In a step 1302, an i-th intermediate result is computed according to the i-th sub-map and the i-th sub-weight; at the same time, an i+1-th sub-map in the on-chip unit map is broadcast from the SRAM 308 to the NRAM 431; an i+1-th sub-weight is loaded from the DRAM 204 to the weight storage unit 702; and the i-th sub-weight in the weight storage unit 702 is overwritten by the i+1-th sub-weight.

In a step 1303, no matter whether the i-th intermediate result is computed, the i+1-th sub-weight is broadcast from the weight storage unit 702 to the second storage space 706. Since the i-th sub-weight is stored in the first storage space 705, the i-th sub-weight is not overwritten by the i+1-th sub-weight, and the correctness of a first computing result is not affected.

In a step 1304, the i-th intermediate result is stored back to the ping storage unit 703; at the same time, an i+1-th intermediate result is computed according to the i+1-th sub-map and the i+1-th sub-weight; an i+2-th sub-map is broadcast from the SRAM 308 to the NRAM 431; an i+2-th sub-weight is loaded from the DRAM 204 to the weight storage unit 702; and the i+1-th sub-weight in the weight storage unit 702 is overwritten by the i+2-th sub-weight.

In a step 1305, no matter whether the i+1-th intermediate result is computed, the i+2-th sub-weight is broadcast from the weight storage unit 702 to the third storage space 707; and the i+1-th sub-weight is not overwritten, and the correctness of a second computing result is not affected.

FIG. 14 is a flowchart of a three-level pipeline with two layers according to another embodiment, where the computing apparatus 201 has a storage space configuration shown in FIG. 7C. In a step 1401, a j-th on-chip unit map and a j-th weight are loaded. In a step 1402, the j-th on-chip unit map is computed to generate a j-th computing result, and synchronously, a j+1-th on-chip unit map is loaded. In a step 1403, the j-th computing result is stored back, the j+1-th on-chip unit map is computed to generate a j+1-th computing result, and synchronously, a j+2-th on-chip unit map is loaded. The step 1402 also includes following steps.

In a step 1404, an i-th sub-map in the j-th on-chip unit map and an i-th sub-weight are broadcast from the SRAM 308 to the NRAM 431 and the WRAM 432.

In a step 1405, an i-th intermediate result is computed according to the i-th sub-map and the i-th sub-weight; and at the same time, an i+1-th sub-map is broadcast from the SRAM 308 to the NRAM 431.

In a step 1406, after the i-th intermediate result is acquired, an i+1-th sub-weight is broadcast from the second storage space 709 to the WRAM 432. Since the WRAM 432 is a whole block of storage space, the i-th sub-weight is overwritten by the i+1-th sub-weight.

In a step 1407, the i-th intermediate result is stored back to the ping storage unit 703; at the same time, an i+1-th intermediate result is computed according to the i+1-th sub-map and the i+1-th sub-weight; and an i+2-th sub-map is broadcast from the SRAM 308 to the NRAM 431.

In a step 1408, after the i+1-th intermediate result is acquired, an i+2-th sub-weight is broadcast from the third storage space 710 to the WRAM 432; and the i+1-th sub-weight in the WRAM 432 is overwritten by the i+2-th sub-weight.

When the computing apparatus 201 has a storage space configuration shown in FIG. 7D, the step 1402 also includes steps shown in FIG. 15.

In a step 1501, an i-th sub-map in the on-chip unit map and an i-th sub-weight are broadcast from the SRAM 308 to the NRAM 431 and the WRAM 432.

In a step 1502, an i-th intermediate result is computed according to the i-th sub-map and the i-th sub-weight; and at the same time, an i+1-th sub-map in the on-chip unit map is broadcast from the SRAM 308 to the NRAM 431.

In a step 1503, no matter whether the i-th intermediate result is computed, an i+1-th sub-weight is broadcast from the weight storage unit 702 to the second storage space 706.

In a step 1504, the i-th intermediate result is stored back to the ping storage unit 703; an i+1-th intermediate result is computed according to the i+1-th sub-map and the i+1-th sub-weight; and an i+2-th sub-map is broadcast from the SRAM 308 to the NRAM 431.

In a step 1505, no matter whether the i+1-th intermediate result is computed, an i+2-th sub-weight is broadcast from the weight storage unit 702 to the third storage space 707.

In the process shown in FIG. 15, since both the weight storage unit 702 and the WRAM 432 are divided into the plurality of pieces of storage space, this embodiment may broadcast sub-weights stored in the weight storage unit 702 to the WRAM 432 at a time. The sub-weights stored in the WRAM 432 have their own storage space and do not overwrite each other, so the computing of intermediate results is not affected.

Another embodiment of the present disclosure is a computer readable storage medium, on which computer program codes for computing a neural network are stored. When the computer program codes are run by a processor, the method disclosed in the aforementioned embodiments is performed.

The present disclosure, based on a three-level operation hierarchy of system on chip-cluster-processor core and three-level memory design of DRAM-SRAM-NRAM/ WRAM, creates a three-level pipeline with two layers and supports a variety of methods to load/broadcast a weight. As such, according to actual requirements, those skilled in the art may select the advantage of reducing input/output overheads or reducing hardware space requirements to run a neural network model, make full use of hardware resources, and improve neural network computing efficiency.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may also be applied to Internet, Internet of Things, data center, energy, transportation, public management, manufacturing, education, power grid, telecommunications, finance, retail, construction sites, medical, and other fields. Further, the electronic device or apparatus of the present disclosure may also be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with hardware information of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It should be explained that for the sake of brevity, the present disclosure describes some method embodiments as a series of actions and combinations thereof, but those skilled in the art may understand that the solution of the present disclosure is not limited by the order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that, for a part that is not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented in other ways that are not disclosed in the present disclosure. For example, for units in the electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may be direct or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units. Additionally, according to actual requirements, some or all of the units may be selected to achieve the purpose of the solution described in the embodiments of the present disclosure. Additionally, in some scenarios, the plurality of units in the embodiments of the present disclosure may be integrated into one unit, or each of the units may be physically separated.

In some implementation scenarios, the integrated unit may be implemented in the form of a software program unit. If the integrated unit is implemented in the form of the software program unit and sold or used as an independent product, the integrated unit may be stored in a computer-readable memory. Based on this, when the solution of the present disclosure is embodied in the form of a software product (such as a computer-readable storage medium), the software product may be stored in a memory. The software product may include several instructions used to enable a computer device (such as a personal computer, a server, or a network device, and the like) to perform part or all of steps of the method of the embodiments of the present disclosure. The memory includes but is not limited to an USB, a flash disk, a read only memory (ROM), a random access memory (RAM), a mobile hard disk, a magnetic disk, or an optical disc, and other media that may store a program code.

In some other implementation scenarios, the integrated unit may be implemented in the form of hardware. The hardware may be a specific hardware circuit, which may include a digital circuit and/or an analog circuit. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The embodiments of the present disclosure have been described in detail above. The present disclosure uses specific examples to explain principles and implementations of the present disclosure. The descriptions of the above embodiments are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed:

1. A method for computing a neural network by using a computing apparatus, the method comprises:
   loading an on-chip unit map from an off-chip memory to a ping storage unit, wherein the ping storage unit stores a plurality of on-chip unit maps;
   loading an i-th sub-weight in a weight from the off-chip memory to a shared storage unit, wherein
      a value of i is a positive integer,
      the computing apparatus is connected to the off-chip memory,
      the off-chip memory contains the on-chip unit map,
      the on-chip unit map corresponds to the weight,
      the computing apparatus comprises a plurality of clusters, and
      each cluster of the plurality of clusters comprises the shared storage unit and a plurality of processor cores;
   broadcasting an i-th sub-map in the on-chip unit map and the i-th sub-weight from the shared storage unit to at least one processor core of the plurality of processor cores;
   computing an i-th intermediate result according to the i-th sub-map and the i-th sub-weight, wherein the i-th sub-weight corresponds to the i-th sub-map;
   loading an i+1-th sub-weight in the weight from the off-chip memory to the shared storage unit;
   broadcasting an i+1-th sub-map in the on-chip unit map from the shared storage unit to at least one processor core of the plurality of processor cores, wherein the i+1-th sub-weight corresponds to the i+1-th sub-map; and
   broadcasting the i+1-th sub-weight from the shared storage unit to at least one processor core of the plurality of processor cores after the computation of the i-th intermediate result, wherein a step of loading the i+1-th sub-weight is performed at the same time as the i-th intermediate result is computed.

2. The method of claim 1, further comprising:
   identifying a sub-weight with a largest storage space in a plurality of sub-weights of the weight; and
   determining a size of a weight storage space in the shared storage unit according to the sub-weight with the largest storage space in the plurality of sub-weights.

3. The method of claim 2, wherein the i+1-th sub-weight overwrites the i-th sub-weight in the weight storage space.

4. The method of claim 1, wherein a step of loading the on-chip unit map and the i-th sub-weight is performed synchronously with a step of loading the i+1-th sub-weight.

5. The method of claim 4, further comprises:
   storing the i-th sub-weight to a first storage space; and
   storing the i+1-th sub-weight to a second storage space, wherein a weight storage space in the shared storage unit comprises the first storage space and the second storage space.

6. The method of claim 1, wherein the broadcasting of the i+1-th sub-weight is performed synchronously with the computing of the i-th intermediate result.

7. The method of claim 6, further comprises:
   storing the i-th sub-weight to a first storage space; and
   storing the i+1-th sub-weight to a second storage space, wherein
      each processor core of the plurality of processor cores comprises a weight storage unit, and
      the weight storage unit comprises the first storage space and the second storage space.

8. The method of claim 1, further comprising:

storing the i-th sub-weight to the weight storage unit; and storing the i+1-th sub-weight to the weight storage unit to overwrite the i-th sub-weight, wherein each processor core of the plurality of processor cores comprises a weight storage unit.

9. A computing apparatus comprises a plurality of clusters, wherein each cluster of the plurality of clusters comprises:

a shared storage unit;

a direct memory access unit, configured to:

load an on-chip unit map from an off-chip memory to a ping storage unit, wherein the ping storage unit stores a plurality of on-chip unit maps, wherein the computing apparatus is connected to the off-chip memory, and the off-chip memory contains an on-chip unit map, and the on-chip unit map corresponds to a weight;

load an i-th sub-weight in the weight from the off-chip memory to a shared storage unit, wherein the i-th sub-weight is corresponding to the on-chip unit map; and load an i+1-th sub-weight in the weight from the off-chip memory to the shared storage unit;

a plurality of processor cores, wherein at least one processor core of the plurality of processor cores is configured to compute an i-th intermediate result according to the i-th sub-map and the i-th sub-weight; and a broadcast bus, configured to:

broadcast an i-th sub-map in the on-chip unit map and the i-th sub-weight from the shared storage unit to at least one of the plurality of processor cores, wherein the i-th sub-weight corresponds to the i-th sub-map;

broadcast an i+1-th sub-map in the on-chip unit map from the shared storage unit to the at least one processor core of the plurality of processor cores, wherein the i+1-th sub-weight corresponds to the i+1-th sub-map; and broadcast the i+1-th sub-weight from the shared storage unit to at least one of the plurality of processor cores after the computation of the i-th intermediate result, wherein a step of loading the i+1-th sub-weight is performed at the same time as the i-th intermediate result is computed.

10. The computing apparatus of claim 9, wherein the computing apparatus is further configured to determine a size of a weight storage space in the shared storage unit according to a sub-weight with the largest storage space in the plurality of sub-weights.

11. The computing apparatus of claim 10, wherein the i+1-th sub-weight overwrites the i-th sub-weight in the weight storage space.

12. The computing apparatus of claim 9, wherein when the direct memory access unit loads the on-chip unit map and the i-th sub-weight, the direct memory access unit synchronously loads the i+1-th sub-weight.

13. The computing apparatus of claim 12, wherein the weight storage space in the shared storage unit comprises:

first storage space, configured to store the i-th sub-weight; and second storage space, configured to store the i+1-th sub-weight.

14. The computing apparatus of claim 9, wherein when the at least one of the plurality of processor cores computes the i-th intermediate result, the broadcast bus synchronously broadcasts the i+1-th sub-weight.

15. The computing apparatus of claim 14, wherein each processor core of the of the plurality of processor cores comprises a weight storage unit, and the weight storage unit comprises:

a first storage space, configured to store the i-th sub-weight; and a second storage space, configured to store the i+1-th sub-weight.

16. The computing apparatus of claim 9, wherein each processor core of the plurality of processor cores comprises a weight storage unit configured to store the i-th sub-weight and the i+1-th sub-weight, and the i+1-th sub-weight overwrites the i-th sub-weight.

* * * * *